(12) United States Patent
Chung et al.

(10) Patent No.: US 12,536,783 B2
(45) Date of Patent: Jan. 27, 2026

(54) OBJECT DETECTION USING DEEP LEARNING FOR REAL-TIME STREAMING APPLICATIONS

(71) Applicant: NVIDIA Corporation, Santa Clara, CA (US)

(72) Inventors: Dahjung Chung, San Jose, CA (US); Farzin Aghdasi, East Palo Alto, CA (US); Parthasarathy Sriram, Los Altos, CA (US); Bingxin Hou, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 645 days.

(21) Appl. No.: 17/895,336

(22) Filed: Aug. 25, 2022

(65) Prior Publication Data

US 2024/0071064 A1    Feb. 29, 2024

(51) Int. Cl.
*G06V 10/82* (2022.01)
*G06V 10/77* (2022.01)

(52) U.S. Cl.
CPC .......... *G06V 10/82* (2022.01); *G06V 10/7715* (2022.01)

(58) Field of Classification Search
CPC .......................... G06V 10/82; G06V 10/7715
See application file for complete search history.

(56) References Cited

U.S. PATENT DOCUMENTS

| | | | | |
|---|---|---|---|---|
| 11,416,672 B2* | 8/2022 | Morariu | ............... | G06V 30/416 |
| 2020/0160559 A1* | 5/2020 | Urtasun | ................. | G06V 10/82 |
| 2020/0210721 A1* | 7/2020 | Goel | ........................ | G06F 18/24 |
| 2021/0216793 A1* | 7/2021 | Goel | ...................... | G06V 20/58 |
| 2023/0084623 A1* | 3/2023 | Hotson | ................. | G06F 18/214 |
| | | | | 701/23 |
| 2023/0126178 A1* | 4/2023 | Fu | ........................ | G06V 40/103 |
| | | | | 382/103 |

OTHER PUBLICATIONS

Liang, D., Xu, W., Bai, X. (2022). An End-to-End Transformer Model for Crowd Localization. In: Avidan, S., Brostow, G., Cissé, M., Farinella, G.M., Hassner, T. (eds) Computer Vision—ECCV 2022. ECCV 2022. Lecture Notes in Computer Science, vol. 13661. Springer, Cham. (Year: 2022).*

(Continued)

*Primary Examiner* — Utpal D Shah
*Assistant Examiner* — Jack Peter Kraynak
(74) *Attorney, Agent, or Firm* — Iron Summit IP LLP

(57) ABSTRACT

In various examples, techniques for optimizing object detection models are described herein. Systems and methods are disclosed that process sensor data using a backbone of a machine learning model(s) in order to generate feature maps at different resolutions. The systems and methods then use the machine learning model(s) to generate a vector based at least in part on one or more of the feature maps. For example, if the backbone generates four feature maps, then the machine learning model(s) may generate the vector using two feature maps from the four feature maps. The systems and methods then process the vector using a transformer of the machine learning model(s) in order to generate data representing a class label(s) for an object(s) depicted by an image represented by the sensor data and/or a location(s) of the object(s) within the image.

20 Claims, 15 Drawing Sheets

(56) References Cited

OTHER PUBLICATIONS

P. Ganesh, Y. Chen, Y. Yang, D. Chen and M. Winslett, "YOLO-ReT: Towards High Accuracy Real-time Object Detection on Edge GPUs," 2022 IEEE/CVF Winter Conference on Applications of Computer Vision (WACV), Waikoloa, HI, USA, 2022, pp. 1311-1321, doi: 10.1109/WACV51458.2022.00138. (Year: 2022).*

C.-Z. Wang, X. Tong, J.-H. Zhu and R. Gao, "Ghost-YOLOX: A Lightweight and Efficient Implementation of Object Detection Model," 2022 26th International Conference on Pattern Recognition (ICPR), Montreal, QC, Canada, 2022, pp. 4552-4558, doi: 10.1109/ICPR56361.2022.9956221 (Year: 2022).*

Y. Wang, W. Sun and Z. Zuo, "Specialized Car Detector for Autonomous Driving," 2019 Chinese Control Conference (CCC), Guangzhou, China, 2019, pp. 6802-6807, doi: 10.23919/ChiCC.2019.8865420. (Year: 2019).*

J. Dong, J. Yuan, L. Li and X. Zhong, "A Lightweight High-Resolution Representation Backbone for Real-Time Keypoint-Based Object Detection," 2020 IEEE International Conference on Multimedia and Expo (ICME), London, UK, 2020, pp. 1-6, doi: 10.1109/ICME46284.2020.9102749. (Year: 2020).*

Zhu, X., Su, W., Lu, L., Li, B., Wang, X., & Dai, J. (2020). Deformable detr: Deformable transformers for end-to-end object detection. arXiv preprint arXiv:2010.04159. (Year: 2020).*

Xu, H., Yan, M., Li, C., Bi, B., Huang, S., Xiao, W., Huang, F.: E2e-vlp: Endto-end vision-language pre-training enhanced by visual learning. arXiv:2106.01804 (2021) (Year: 2021).*

Yang, Z., Miao, J., Wang, X., Wei, Y., & Yang, Y. (2022). Associating Objects with Scalable Transformers for Video Object Segmentation. ArXiv, abs/2203.11442. (Year: 2022).*

Liang, T., Bao, H., Pan, W., Fan, X., & Li, H. (2022). DetectFormer: Category-Assisted Transformer for Traffic Scene Object Detection. Sensors (Basel, Switzerland), 22(13), 4833. https://doi.org/10.3390/s22134833 (Year: 2022).*

Y. Cai et al., "YOLOv4-5D: An Effective and Efficient Object Detector for Autonomous Driving," in IEEE Transactions on Instrumentation and Measurement, vol. 70, pp. 1-13, 2021, Art No. 4503613, doi: 10.1109/TIM.2021.3065438. (Year: 2021).*

\* cited by examiner

OBJECT DETECTION USING DEEP LEARNING FOR REAL-TIME STREAMING APPLICATIONS

BACKGROUND

Neural networks are common tools for object detection. In many circumstances, it is important for these object detection models to have a high detection accuracy with relatively low computational requirements. This way, the object detection models may be used with the available hardware of machines that execute the object detection models. Additionally, the object detection models may perform tasks in real-time and/or near real-time, which is important for many machines. For example, an object detection model that is executing on an edge device (e.g., a video monitor) or deployed in an autonomous or semi-autonomous machine (e.g., vehicle, robot, aircraft, etc.) may need to detect objects and/or the locations of objects in real-time or near real-time when performing one or more downstream operations—such as determining the occupancy, activity, behavior, or traffic in an area; monitoring or surveilling an area for unauthorized access or behavior; detecting objects or persons in an area; or determining trajectories for traversing an environment in which the detected objects are located.

One suitable object detection model is deformable-DETR. Deformable-DETR uses a backbone, such as a Convolutional Neural Network (CNN), to process input image data. The output from the backbone includes four feature maps, where each feature map is derived from one level of the backbone. For instance, the lowest level derives a higher resolution feature map, while the three higher levels derive feature maps at progressively lower resolutions, where each level is a reduced resolution representation of the previous level. The four feature maps are then used to generate a vector that is input into the transformer of the deformable-DETR. The transformer processes the vector and outputs data indicating a type(s) of an object(s) represented by the image data and/or the location(s) of the object(s). While deformable-DETR models are able to achieve high accuracy, typical deformable-DETR models also require a high computational load which leads to increased latency. As a result of this latency, deformable-DETR models are less suitable for performing tasks—such as object detection—in real-time or near real-time.

SUMMARY

Embodiments of the present disclosure relate to techniques for optimizing object detection models. Systems and methods are disclosed that use a backbone of a machine learning model(s) to process image data in order to generate a feature map(s). The machine learning models(s) may be configured to use a select number of the feature maps to generate a vector. For example, if the backbone of the machine learning model(s) generates four feature maps, then the machine learning model(s) may be configured to select two of the feature maps to generate the vector. In some examples, the machine learning model(s) is configured to select the lowest resolution feature map(s), the highest resolution feature map(s), and/or any other combination of the feature maps for generating the vector. The systems and methods may then input the vector into a transformer of the machine learning model(s), where the transformer processes the vector in order to generate output data. The output data may represent a class label(s) of an object(s) represented by the image data and/or a location(s) of the object(s) in an image (and/or in the real-world) represented by the image data.

In contrast to conventional systems, such as those described above, the present systems may reduce the overall number of feature maps that are used to generate the vector that is input into the transformer. For example, instead of generating the vector using the four feature maps, the systems described herein may generate the vector using three or less of the feature maps, and/or may include a backbone that only generates the three or less feature maps. As a result, the size of the vector that is input into the transformer of the machine learning model(s) is reduced as compared to the vectors that are input into the transformers of the traditional object detection models used by the conventional systems. Since the transformer portion of the machine learning model(s) uses the majority of the compute resources and/or processing time, reducing the size of the vector that is processed by the transformer also reduces the compute resources required and the runtime of the machine learning model(s) and/or the system executing the same. Additionally, the machine learning model(s) may provide for better accuracy and precision as compared to the traditional object detection models, especially for particular object detection tasks and/or objects.

BRIEF DESCRIPTION OF THE DRAWINGS

The present systems and methods for optimizing object detection models are described in detail below with reference to the attached drawing figures, wherein.

DETAILED DESCRIPTION

Figure 1A:
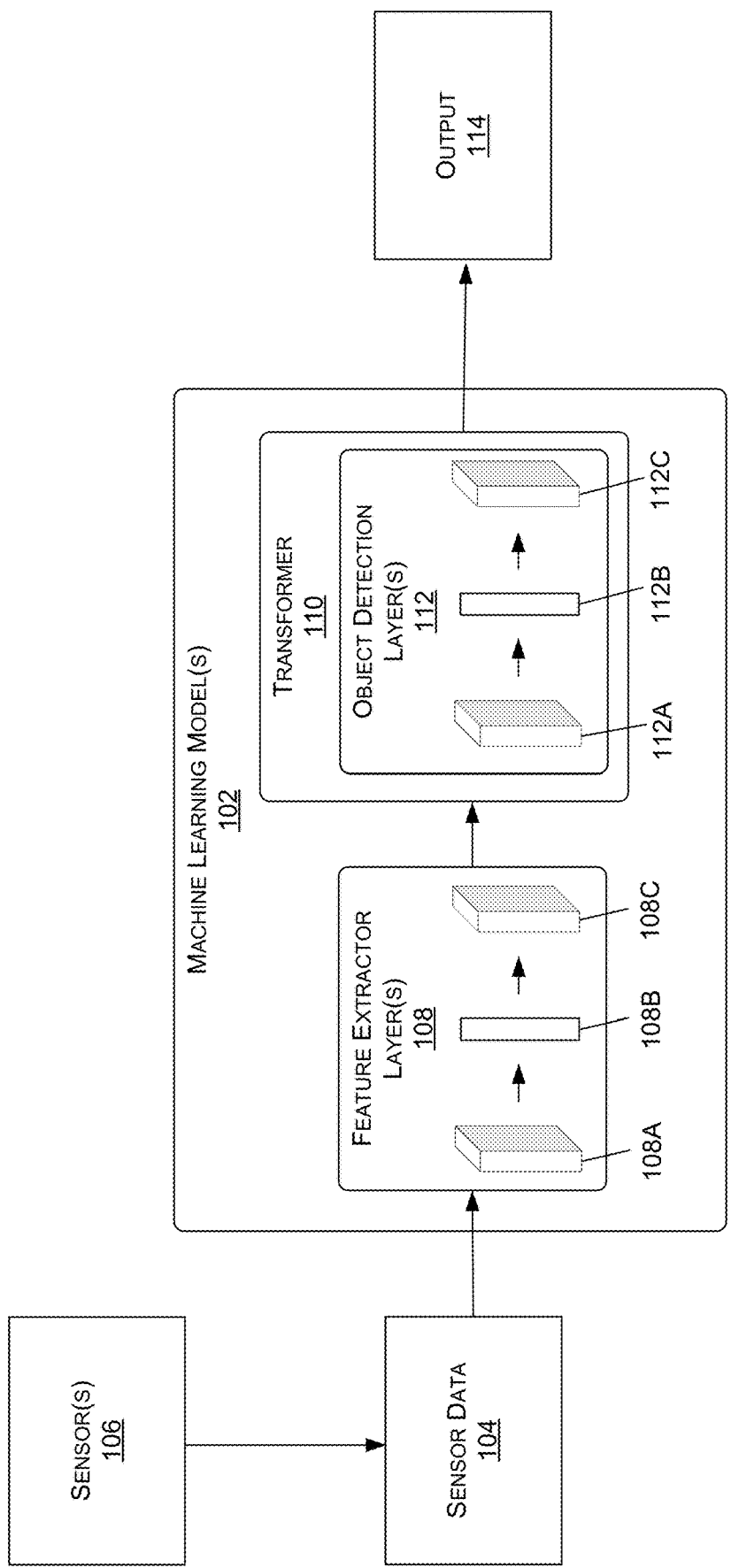
FIGS. 1A-1B illustrate examples of machine learning models for detecting objects, in accordance with some embodiments of the present disclosure.

Systems and methods are disclosed related to techniques for optimizing object detection models. Although the present disclosure may be described with respect to an example autonomous vehicle 700 (alternatively referred to herein as "vehicle 700" or "ego-machine 700," an example of which is described with respect to FIGS. 7A-7D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to object detection for autonomous vehicles, this is not intended to be limiting, and the systems and methods described herein may be used in augmented reality, virtual reality, mixed reality, robotics, security and surveillance, autonomous or semi-autonomous machine applications, and/or any other technology spaces where object detection may be used.

A machine learning model(s) may include a backbone (also referred to as the "feature extracting network") that processes image data in order to generate one or more feature maps. As described herein, the backbone may include, but is not limited to, ResNet (e.g., ResNet50), Inception-ResNet-V2, AlexNet, DarkNet-19, and/or any other type of backbone. In some examples, the backbone processes the image data using one or more layers to generate one or more levels of feature maps. For example, a first layer(s) may process the image data at a first resolution to generate a first resolution feature map and a second resolution feature map, a second layer(s) may process the image data at a second resolution to generate a third resolution feature map, a third layer(s) may process the image data at a third resolution to generate a fourth resolution feature map, and/or so on. In some examples, one or more (e.g., each) of the feature maps includes the same resolution. In other examples, one or more of the feature maps include a resolution that differs from another resolution of another feature map. For instance, and using the example above, the first resolution feature map may include a higher resolution than the second resolution feature map, the second resolution feature map may include a higher resolution than the third resolution feature map, and the third resolution feature map may include a higher resolution than the fourth resolution feature map.

The machine learning model(s) may then be configured to use one or more of the feature maps to generate a vector. In some examples, the machine learning model(s) may be configured to use less than an entirety of the feature maps to generate the vector. For example, the machine learning model(s) may be configured to use the lowest resolution feature map(s), the highest resolution feature map(s), and/or any other combination of the feature maps to generate the vector. The machine learning model(s) may then input the vector into a transformer of the machine learning model(s), where the transformer processes the vector in order to generate an output representing the class label(s) of the object(s) represented by the image data and/or the location(s) of the object(s) in an image represented by the image data. By using less than all the feature maps to generate the vector, the size of the vector that is input into the transformer of the machine learning model(s) is reduced as compared to vectors that are input into the transformers of traditional object detection models, such as deformable-DETR. Since the transformer portion of the machine learning model(s) uses the majority of the compute resources and/or processing time, reducing the size of the vector also reduces the compute resources and runtime of the machine learning model(s) and/or the system executing the same.

In order to increase the accuracy of the machine learning model(s), even when less than all of the feature maps are used to generate the vector, the machine learning model(s) may be trained using image data (also referred to as "training data") that is selected specifically for the configuration of the machine learning model(s). For example, the image data may be selected based on the type(s) of object(s) that the machine learning model(s) is configured to detect, the location(s) of the camera(s) that generates the image data being processed by the machine learning model(s), and/or the feature map(s) that the machine learning model(s) is configured to use to generate the vector. By training the machine learning model(s) with such training data, the machine learning model(s) described herein may be more accurate and precise as compared to the traditional object detection models, especially for particular object detection tasks and/or objects.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, real-time streaming, virtual reality (VR), augmented reality (AR), or mixed reality (MR), model training, perception, augmented reality, virtual reality, mixed reality, robotics, security and surveillance, object detection, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing object detection, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1A, FIG. 1A illustrates an example of a machine learning model(s) 102 for detecting objects, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 700 of FIGS. 7A-7D, example computing device 800 of FIG. 8, and/or example data center 900 of FIG. 9.

As shown, sensor data 104 may be applied to the machine learning model(s) 102. In embodiments where the sensor data 104 includes image data, the image data may include data representative of images of a field of view of one or more cameras (e.g., image sensors) of a vehicle 700, such as stereo camera(s), wide-view camera(s) (e.g., fisheye cameras), infrared camera(s), surround camera(s) (e.g., 360 degree cameras), long-range and/or mid-range camera(s), and/or other camera type of the autonomous vehicle. In some examples, the image data may be captured in one format (e.g., RCCB, RCCC, RBGC, etc.), and then converted (e.g., during pre-processing of the image data) to another format. In some other examples, the image data may be provided as input to a sensor data pre-processor (not shown) to generate pre-processed image data (discussed herein). Many types of images or formats may be used as inputs; for example, compressed images such as in Joint Photographic Experts Group (JPEG), Red Green Blue (RGB), or Luminance/Chrominance (YUV) formats, compressed images as frames stemming from a compressed video format such as H.264/Advanced Video Coding (AVC) or H.265/High Efficiency Video Coding (HEVC), raw images such as originating from Red Clear Blue (RCCB), Red Clear (RCCC) or other type of imaging sensor. In some examples, different formats and/or resolutions could be used for training the machine learning model(s) 102 than for inferencing (e.g., during deployment of the machine learning model(s) in the autonomous vehicle).

In some examples, before applying the sensor data 104, a sensor data pre-processor may use image data representative of one or more images (or other data representations) and load the sensor data 104 into memory in the form of a multi-dimensional array/matrix (alternatively referred to as tensor, or more specifically an input tensor, in some examples). The array size may be computed and/or represented as W×H×C, where W stands for the image width in pixels, H stands for the height in pixels, and C stands for the number of color channels. Without loss of generality, other types and orderings of input image components are also possible. Additionally, the batch size B may be used as a dimension (e.g., an additional fourth dimension) when batching is used. Batching may be used for training and/or for inference. Thus, the input tensor may represent an array of dimension W×H×C×B. Any ordering of the dimensions may be possible, which may depend on the particular hardware and software used to implement the sensor data pre-processor. This ordering may be chosen to maximize training and/or inference performance of the machine learning model(s) 102.

In some embodiments, a pre-processing image pipeline may be employed by the sensor data pre-processor to process a raw image(s) acquired by a sensor(s) 106 (e.g., camera(s)) and included in the image data to produce pre-processed image data which may represent an input image(s) to the input layer(s) of the machine learning model(s) 102. An example of a suitable pre-processing image pipeline may use a raw RCCB Bayer (e.g., 1-channel) type of image from the sensor 106 and convert that image to a RCB (e.g., 3-channel) planar image stored in Fixed Precision (e.g., 16-bit-per-channel) format. The pre-processing image pipeline may include decompanding, noise reduction, demosaicing, white balancing, histogram computing, and/or adaptive global tone mapping (e.g., in that order, or in an alternative order).

Where noise reduction is employed by the sensor data pre-processor, it may include bilateral denoising in the Bayer domain. Where demosaicing is employed by the sensor data pre-processor, it may include bilinear interpolation. Where histogram computing is employed by the sensor data pre-processor, it may involve computing a histogram for the C channel, and may be merged with the decompanding or noise reduction in some examples. Where adaptive global tone mapping is employed by the sensor data pre-processor, it may include performing an adaptive gamma-log transform. This may include calculating a histogram, getting a mid-tone level, and/or estimating a maximum luminance with the mid-tone level.

The machine learning model(s) 102 may use the sensor data 104 (with or without pre-processing) as an input. As described herein, the sensor data 104 may include individual images generated by the sensor(s) 106 (e.g., camera(s)), where image data representative of one or more of the individual images may be input into the machine learning model(s) 102 at each iteration of the machine learning model(s) 102. The sensor data 104 may be input as a single image, or may be input using batching, such as mini-batching. For example, two or more images may be used as inputs together (e.g., at the same time).

The sensor data 104 may be input into a feature extractor layer(s) 108 of the machine learning model(s) 102. The feature extractor layer(s) 108 may include any number of layers 108, such as the layers 108A-108C. One or more of the layers 108 may include an input layer. The input layer may hold values associated with the sensor data 104. For example, when the sensor data 104 is an image(s), the input layer may hold values representative of the raw pixel values of the image(s) as a volume (e.g., a width, W, a height, H, and color channels, C (e.g., RGB), such as 32.times.32.times.3), and/or a batch size, B (e.g., where batching is used).

One or more layers 108 may include convolutional layers. The convolutional layers may compute the output of neurons that are connected to local regions in an input layer (e.g., the input layer), each neuron computing a dot product between their weights and a small region they are connected to in the input volume. A result of a convolutional layer may be another volume, with one of the dimensions based on the number of filters applied (e.g., the width, the height, and the number of filters, such as 32.times.32.times.12, if 12 were the number of filters).

One or more of the layers 108 may include a rectified linear unit (ReLU) layer. The ReLU layer(s) may apply an elementwise activation function, such as the max (0, x), thresholding at zero, for example. The resulting volume of a ReLU layer may be the same as the volume of the input of the ReLU layer.

One or more of the layers 108 may include a pooling layer. The pooling layer may perform a down-sampling operation along the spatial dimensions (e.g., the height and the width), which may result in a smaller volume than the input of the pooling layer (e.g., 16.times.16.times.12 from the 32.times.32.times.12 input volume). In some examples, the machine learning model(s) 102 may not include any pooling layers. In such examples, other types of convolution layers may be used in place of pooling layers. In some examples, the feature extractor layer(s) 108 may include alternating convolutional layers and pooling layers.

One or more of the layers 108 may include a fully connected layer. Each neuron in the fully connected layer(s) may be connected to each of the neurons in the previous volume. The fully connected layer may compute class scores, and the resulting volume may be 1.times.1.times.number of classes. In some examples, the feature extractor layer(s) 108 may include a fully connected layer, while in other examples, the fully connected layer of the machine learning model(s) 102 may be the fully connected layer separate from the feature extractor layer(s) 108. In some examples, no fully connected layers may be used by the feature extractor layer(s) 108 and/or the machine learning model(s) 102 as a whole, in an effort to increase processing times and reduce computing resource requirements. In such examples, where no fully connected layers are used, the machine learning model(s) 102 may be referred to as a fully convolutional network.

One or more of the layers 108 may, in some examples, include deconvolutional layer(s). However, the use of the term deconvolutional may be misleading and is not intended to be limiting. For example, the deconvolutional layer(s) may alternatively be referred to as transposed convolutional layers or fractionally strided convolutional layers. The deconvolutional layer(s) may be used to perform up-sampling on the output of a prior layer. For example, the deconvolutional layer(s) may be used to up-sample to a spatial resolution that is equal to the spatial resolution of the input images (e.g., the sensor data 104) to the machine learning model(s) 102, or used to up-sample to the input spatial resolution of a next layer.

Although input layers, convolutional layers, pooling layers, ReLU layers, deconvolutional layers, and fully connected layers are discussed herein with respect to the feature extractor layer(s) 108, this is not intended to be limiting. For example, additional or alternative layers 108 may be used in the feature extractor layer(s) 108, such as normalization layers, SoftMax layers, and/or other layer types.

The output of the feature extractor layer(s) 108 may be feature maps and/or a vector that is generated using one or more of the feature maps. As described herein, each of the feature maps may include a same resolution or one or more of the feature maps may include a resolution that differs from one or more of the other feature maps. In some examples, the vector is generated using all of the feature maps. In other examples, the vector is generated using less than all of the feature maps. For example, and as will be illustrated in FIG. 1B, if the feature extractor layer(s) 108 generate four feature maps, then the machine learning model(s) 102 may generate the vector using one, two, or three of the four feature maps.

The vector may be an input to a transformer 110 of the machine learning model(s) 102, where the transformer 110 includes one or more object detection layers 112. The object detection layer(s) 112 may include any number of layers 112, such as the layers 112A-112C. The object detection layer(s) 112 may use one or more of the layer types described herein with respect to the feature extractor layer(s) 108. As described herein, the object detection layer(s) 112 may not include any fully connected layers, in some examples, to reduce processing speeds and decrease computing resource requirements. In such examples, the object detection layer(s) 112 may be referred to as fully convolutional layers.

Different orders and numbers of the layers 108 and 112 of the machine learning model(s) 102 may be used, depending on the embodiment. For example, where two or more cameras or other sensor types are used to generate inputs, there may be a different order and number of layers 108 and 112 for one or more of the sensors 106. As another example, different ordering and numbering of layers may be used depending on the type of sensor used to generate the sensor data 106, or the type of the sensor data 106 (e.g., RGB, YUV, etc.). As such, the order and number of layers 108 and 112 of the machine learning model(s) 102 is not limited to any one architecture.

In addition, some of the layers 108 and 112 may include parameters (e.g., weights and/or biases)—such as the feature extractor layer(s) 108 and/or the object detection layer(s) 112—while others may not, such as the ReLU layers and pooling layers, for example. In some examples, the parameters may be learned by the machine learning model(s) 102 during training. Further, some of the layers 108 and 112 may include additional hyper-parameters (e.g., learning rate, stride, epochs, kernel size, number of filters, type of pooling for pooling layers, etc.)—such as the convolutional layer(s), the deconvolutional layer(s), and the pooling layer(s)—while other layers may not, such as the ReLU layer(s). Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

In any example, the output 114 of the machine learning model(s) 102 may indicate a class label(s) for an object(s) depicted by an image represented by the sensor data 104 and/or a location(s) of the object(s) within the image (and/or within three-dimensional real-world space). The output 114 is described in more detail herein at least with regard to FIG. 1B.

Figure 1B:
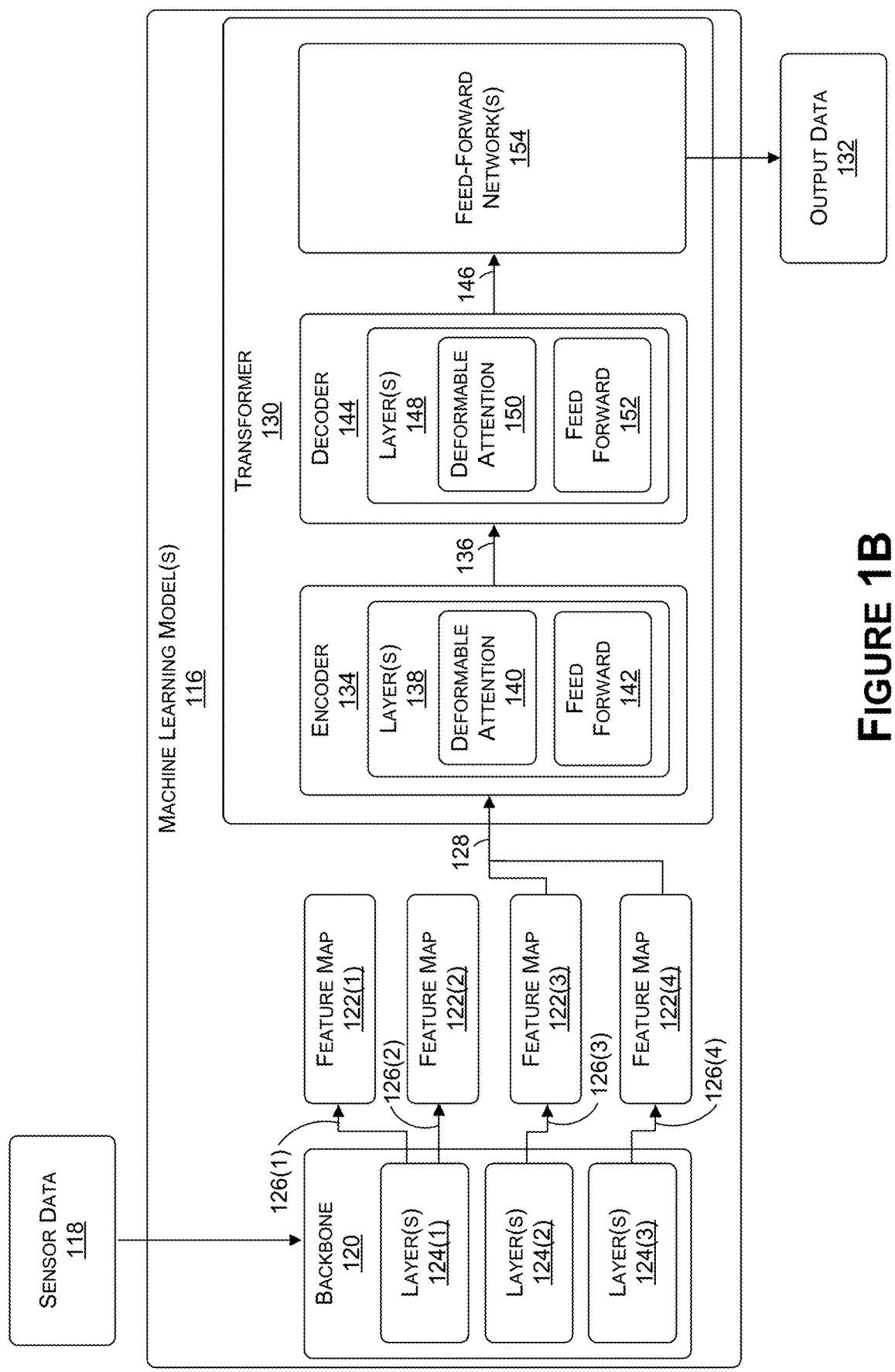

FIG. 1B illustrates another example of a machine learning model(s) 116 for detecting objects, in accordance with some embodiments of the present disclosure. In some examples, the machine learning model(s) 116 may represent and/or include the machine learning model(s) 102.

As shown, a backbone 120 of the machine learning model(s) 116 may process sensor data 118 in order to generate feature maps 122(1)-(4) (also referred to singularly as "feature map 122" or in plural as "feature maps 122"). As described herein, the backbone 120 may include, but is not limited to, ResNet (e.g., ResNet50), Inception-ResNet-V2, AlexNet, DarkNet-19, and/or any other type of backbone. In some examples, the backbone 120 processes the sensor data 118 using one or more layers 124(1)-(3) (also referred to singularly as "layer 124" or in plural as "layers 124") (which may represent, and/or include, the feature extractor layer(s) 108) to initially generate one or more levels of the feature maps 122. For example, such as when the sensor data 118 is image data, the first layer(s) 124(1) may process the image data at a first resolution to generate the first feature map 122(1) and the second feature map 122(2), the second layer(s) 124(2) may process the image data at a second resolution to generate the third feature map 122(3), and the third layer(s) 124(3) may process the image data at a third resolution to generate the fourth feature map 122(4). In some examples, the image data processed at each layer 124 includes the same resolution. In other examples, the image data processed at each layer 124 includes a different resolution. For instance, and using the example above, the first resolution (e.g., 32×32×2048) may be greater than the second resolution (e.g., 16×16×1164) and the second resolution (e.g., 16×16×1164) may be greater than the third resolution (e.g., 8×8×512).

In some examples, the machine learning model(s) 116 may include one or more filters 126(1)-(4) (also referred to singularly as "filter 126" or in plural as "filters 126") (alternatively referred to herein as "kernels 126(1)-(4)") to generate the feature maps 122. For instance, and using the example above, a first initial feature map generated by the first layer(s) 124(1) may include a first initial resolution (e.g., 32×32×2048). As such, the machine learning model(s) 116 may process this first initial feature map using the first (e.g., convolutional) filter 126(1) (e.g., Cony 1×1, stride 2) to generate the first feature map 122(1) at a first resolution (e.g., 64×64×256) and process the first initial feature map using the second filter 126(2) (e.g., Conv 1×1, stride 1) to generate the second feature map 122(2) at a second resolution (e.g., 32×32×256). A second initial feature map generated by the second layer(s) 124(2) may include a second initial resolution (e.g., 16×16×1164). As such, the machine learning model(s) 116 may process this second initial feature map using the third filter 126(3) (e.g., Cony 1×1, stride 1) to generate the third feature map 122(3) at a third resolution (e.g., 16×16×256). Furthermore, a third initial feature map generated by the third layer(s) 124(3) may include a third initial resolution (e.g., 8×8×512). As such, the machine learning model(s) 116 may process this third initial feature map using the fourth filter 126(4) (e.g., Cony 1×1, stride 1) to generate the fourth feature map 122(4) at a fourth resolution (e.g., 8×8×256).

While the example of FIG. 1B illustrates three layers 124 that are used to generate four feature maps 122, in other examples, the backbone 120 may include any number of layers 124 that generate any number of feature maps 122. For example, the backbone 120 may include one layer 124, two layers 124, five layers 124, ten layers 124, and/or the like that generate one feature map 122, three feature maps 122, five feature maps 122, ten feature maps 122, and/or the like. Additionally, while the examples above provide specific examples of resolutions for image data and feature maps 122, in other examples, the image data and/or the feature maps 122 may include any resolutions. Furthermore, while the examples above provide specific examples of filters 126, in other examples, the machine learning model(s) 116 may include any type of filter 126. Similarly, while the examples described herein primarily relate to using image data generated using one or more cameras, this is not intended to be limiting, and other sensor types and corresponding sensor data types may be used without departing from the scope of the present disclosure. For example, LiDAR sensors, RADAR sensors, ultrasonic sensors, and/or other sensor types—such as those described herein with respect to the ego-machine 700 of FIG. 7A-7D—may be used.

In some examples, the machine learning model(s) 116 may be configured to use a given number (e.g., less than all) of the feature maps 122 to generate a vector 128 that is input into a transformer 130 (which may represent, and/or include, the transformer 110) of the machine learning model(s) 116. For example, such as when the backbone 120 generates the four feature maps 122, the machine learning model(s) 116 may be configured to use only two of the feature maps 122 to generate the vector 128. In the example of FIG. 1B, the two feature maps 122 include the third feature map 122(3) and the fourth feature map 122(4) (e.g., the two lowest resolution feature maps 122). However, in other examples, the machine learning model(s) 116 may be configured to generate (e.g., using one or more layer(s)) the vector 128 using any other combination of two feature maps 122, such as the first feature map 122(1) and the second feature map 122(2) (e.g., the two highest resolution feature maps 122). Additionally, in other examples, the machine learning model(s) 116 may be configured to use a different number of the feature maps 122, such as one of the feature maps 122, three of the feature maps 122, or all the feature maps 122 to generate the vector 128. In some non-limiting examples, the machine learning model(s) 116 may be configured to use only a single feature map, such as only the highest resolution feature map 122, as the highest resolution feature map 122 have encoded therein the most data for identifying the object(s) and/or the object location(s) using the transformer 130.

Furthermore, while the example of FIG. 1B illustrates the backbone 120 generating the four feature maps 122, as described herein, in other examples, the backbone 120 may generate any number of feature maps 122. In such examples, the machine learning model(s) 116 may again be configured to use less than all the feature maps 122 or all of the feature maps 122 to generate the vector 128. For a first example, if the backbone 120 generates two feature maps 122, then the machine learning model(s) 116 may be configured to use one of the feature maps 122 (e.g., the lowest resolution feature map 122 or the highest resolution feature map 122) or both of the feature maps 122 to generate the vector 128. For a second example, if the backbone 120 generates ten feature maps 122, then the machine learning model(s) 116 may be configured to use all ten of the feature maps 122 or any combination of nine or less of the feature maps 122 to generate the vector 128.

Moreover, in some examples, the machine learning model(s) 116 may be configured to use different combinations of the feature maps 122. For example, the machine learning model(s) 116 may be configured to use the third feature map 122(3) and the fourth feature map 122(4) to generate a first vector 128 when processing first sensor data 118, use the first feature map 122(1) and the second feature map 122(2) to generate a second vector 128 when processing second sensor data 118, and/or so forth. In such examples, the machine learning model(s) 116 may switch between various combinations of the feature maps 122 based on the type(s) of object(s) being detected by the machine learning model(s) 116, the location(s) of the sensor(s) generating the sensor data 118, and/or any other factors. For example, and as described in more detail below with regard to the training of the machine learning model(s) 116, the machine learning model(s) 116 may be configured to use the first feature map 122(1) and the second feature map 122(2) (e.g., the highest resolution feature maps 122) when processing first sensor data 118 that represents small scale objects, and use the third feature map 122(3) and the fourth feature map 122(4) (e.g., the lowest resolution feature maps 122) when processing second sensor data 118 that represents large scale objects—e.g., because less encoded information may be suitable when the objects are larger.

As described herein, the size of the vector 128 may depend on one or more factors, such as the number of feature maps 122 that the machine learning model(s) 116 uses to generate the vector 128 and/or the resolution(s) of the feature map(s) 122 that the machine learning model(s) 116 uses to generate the vector 128. For a first example, the vector 128 may include a first size when the machine learning model(s) 116 uses only two of the feature maps 122 to generate the vector 128 and a second, larger size when the machine learning model(s) 116 uses three of the feature maps 122 to generate the vector 128. For a second example, the vector 128 may include a first size when the machine learning model(s) 116 uses the two lowest resolution feature maps 122(3)-(4) to generate the vector 128 and a second, larger size when the machine learning model(s) 116 uses the two highest resolution feature maps 122(1)-(2) to generate the vector 128. As such, the machine learning model(s) 116 may be configured to use a specific feature map(s) 122 based on the processing requirements for the machine learning model(s) 116, such as the latency requirements. This is because the latency of the machine learning model(s) 116 may increase as the size of the vector 128 increases.

Figure 2:
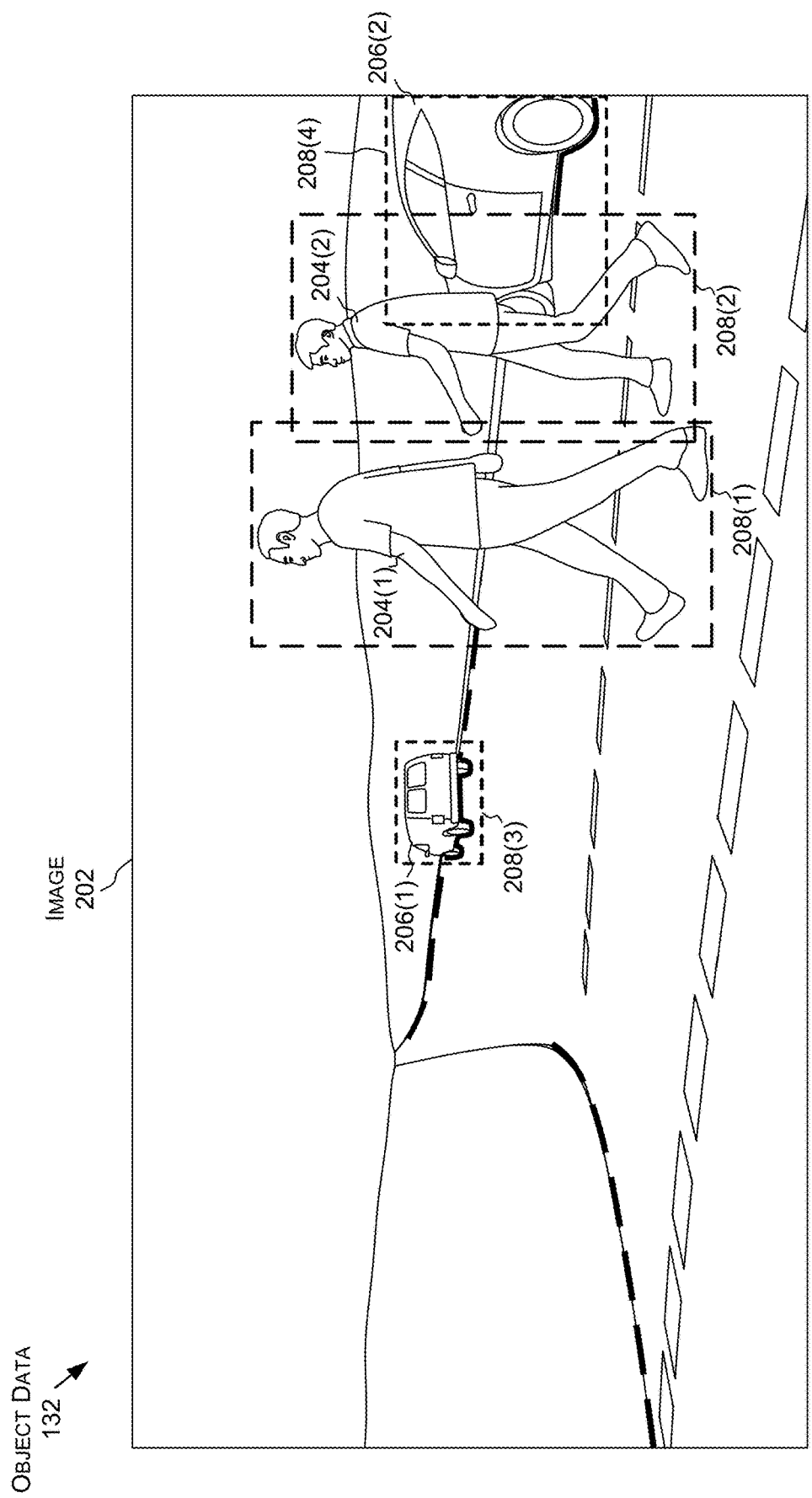
FIG. 2 illustrates an example output from a machine learning model(s), in accordance with some embodiments of the present disclosure.

As further illustrated in the example of FIG. 1B, the machine learning model(s) 116 may process the vector 128 using the transformer 130. The transformer 130 may be configured to process the vector 128 and output data 132 indicating a class label(s) of an object(s) depicted by an image represented by the sensor data 118 and/or a location(s) of the object(s) within the image. For instance, FIG. 2 illustrates an example visualization of an output from the machine learning model(s) 116, in accordance with some embodiments of the present disclosure. In the visualization of FIG. 2, the sensor data 118 processed by the machine learning model(s) 116 may represent an image 202, where the image 202 depicts two people 204(1)-(2) walking across a street and two vehicles 206(1)-(2).

As shown, the output data 132 may indicate locations for the people 204(1)-(2) and the vehicles 206(1)-(2), where the locations are represented by bounding shapes 208(1)-(4). Although illustrated as bounding boxes, in other examples, the locations may be represented by other bounding shapes 208, such as circles, rectangles, polygons, and/or any other shape. The output data 132 further indicates the class labels associated with the people 204(1)-(2) and the vehicles 206(1)-(6), where the bounding boxes 208(1)-(2) associated with the people 204(1)-(2) include a first characteristic (e.g., long-dashed lines) and the bounding boxes 208(3)-(4) associated with the vehicles 206(1)-(2) include a second characteristic (e.g., short-dashed lines). However, in other examples of generating visualizations representing outputs of the machine learning model(s), the first characteristic and/or the second characteristic may be any type of characteristic. For example, the first characteristic and/or the second characteristic may include colors, shading, shapes, text, and/or the like that represent the different class labels.

While the example of FIG. 2 illustrates the output data 132 as indicating the class labels and locations of the people 204(1)-(2) and the vehicles 206(1)-(2), in other examples, the output data 132 may additionally and/or alternatively indicate the class labels and/or locations of other objects depicted by the image 202. For example, the output data 132 may indicate the class labels and locations of the road features, such as the road lines, road boundaries, and/or the like.

Referring back to FIG. 1B, to process the vector 128 using the transformer 130, the machine learning model(s) 116 may initially input the vector 128 into an encoder 134 of the transformer 130 that processes the vector 128 and outputs at least one other vector 136 (also referred to as an "encoding(s)"). In some examples, the encoder 134 reduces the channel dimension of the vector 128 to create a new feature map represented by the at least one other vector 136 (e.g., both the input and the output of the encoder 134 may include a vector(s) representing a multi-scale feature map(s)). In some examples, the encoder 134 includes a number of layers 138 (which may represent, and/or include, one or more of the object detection layer(s) 112), such as two layers 138, four layers 138, five layers 138, six layers 138, eight layers 138, ten layers 138, and/or any other number of layers 138. In some examples, each layer 138 of the encoder 134 may include a standard architecture that consists of a multi-head self-attention module (which is represented by the deformable attention 140) and a feed forward network (FFT) 142.

The at least one other vector 136 is then input into a decoder 144 of the transformer 130, where the decoder 144 processes the at least one other vector 136 and outputs data 146 (which may represent another vector). The data 146 may indicate the predictions for bounding shape coordinates and class labels for each object depicted by the image. In some examples, the decoder 144 may include a number of layers 148 (which may represent, and/or include, one or more of the object detection layer(s) 112), such as two layers 148, four layers 148, five layers 148, six layers 148, eight layers 148, ten layers 148, and/or any other number of layers 148. In some examples, the decoder 144 follows a standard architecture, where each layer 148 includes embeddings with multi-head self- and encoder-decoder attention mechanisms (which is represented by the deformable attention 150) and a FFT 152. In some examples, the decoder 144 decodes the objects in parallel at each decoder layer 148 while, in other examples, the decoder 144 predicts the output sequence one element or some other number of elements (but not all elements) at a time.

In some examples, the machine learning model(s) 116 may be configured such that the encoder 134 uses a set number of the layer(s) 138 and/or the decoder 144 uses a set number of the layer(s) 144 (where the number of layer(s) 134 and 144 is described above). In such examples, reducing the number of layer(s) 134 used by the encoder 134 and/or reducing the number of layer(s) 144 used by the decoder 144 may reduce the compute resources used by the machine learning model(s) 116 and/or the processing time of the machine learning model(s) 116. This is because the transformer 116, and specifically the encoder 134, may use most of the compute resources of the machine learning model(s) 116. As such, the transformer 130, and specifically the encoder 134, may also be the cause for most of the processing time. Because of this, reducing the number of the layer(s) 138 and/or the number of the layer(s) 144 may decrease the compute resources and/or the processing time of the machine learning model(s) 116.

The data 146 that is output by the decoder 144 may then be input into a feed-forward network(s) (FFN(s)) 154 of the transformer 130. The FFN(s) 154 may process the data 146 in order to predict coordinates—e.g., normalized center coordinates, the height, and the width—of the respective bounding shape with respect to each object depicted in the image. The FFN(s) 154 may also process the data 146 to predict the respective class label for each object. In some examples, since the transformer 130 may be configured to predict a fixed-size set of bounding shapes, where the fixed-size set is usually larger than the number of objects depicted by the image, an additional class label may be used to represent that no object is detected in a slot. For instance, and using the example of FIG. 2, if the transformer 130 is configured to predict three hundred objects, but the image 202 only depicts four objects, then the additional class label may be used for the other two hundred ninety-six predictions.

Figure 3:
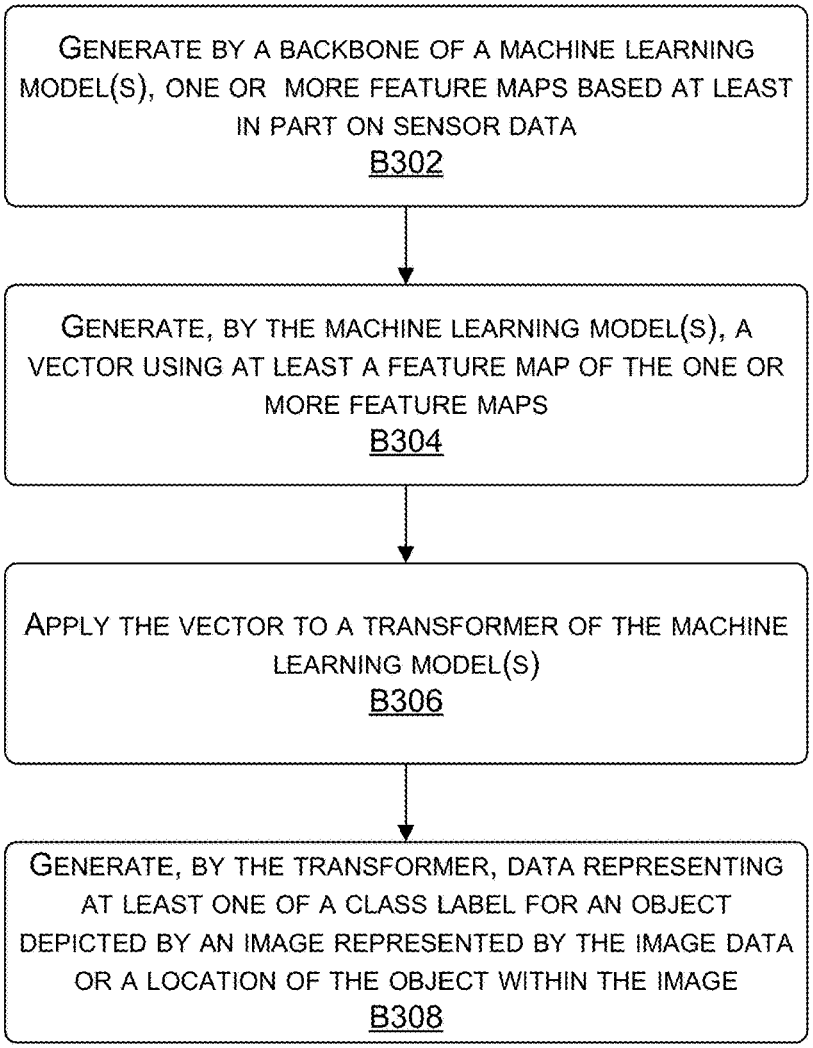
FIG. 3 illustrates a flow diagram showing a method for processing sensor data using a machine learning model(s), in accordance with some embodiments of the present disclosure.

Now referring to FIG. 3, each block of method 300, described herein, comprises a computing process that may be performed using any combination of hardware, firmware, and/or software. For instance, various functions may be carried out by a processor executing instructions stored in memory. The method 300 may also be embodied as computer-usable instructions stored on computer storage media. The method 300 may be provided by a standalone application, a service or hosted service (standalone or in combination with another hosted service), or a plug-in to another product, to name a few. In addition, the method 300 is described, by way of example, with respect to the machine learning model(s) 116 of FIG. 1B. However, the method 300 may additionally or alternatively be executed by any one system, or any combination of systems, including, but not limited to, those described herein.

FIG. 3 illustrates a flow diagram showing the method 300 for processing sensor data using a machine learning model(s), in accordance with some embodiments of the present disclosure. The method 300, at block B302, includes generating, using one or more first layers of a machine learning model(s), one or more feature maps based at least in part on sensor data. For instance, the machine learning model(s) 116 may process the sensor data 118 using the layer(s) 124 in order to generate the feature map(s) 122. As described herein, the layer(s) 124 of the backbone 120 may generate any number of the feature maps 122, such as one feature map 122, two feature maps 122, four feature maps 122, and/or the like. Additionally, the backbone 120 may generate the feature map(s) 122 at different resolutions.

The method 300, at block B304, includes generating, using one or more second layers of the machine learning model(s), a vector using at least a feature map of the one or more feature maps. For instance, the machine learning model(s) 116 may use one or more layers to generate the vector 128 using at least one of the feature map(s) 122. In some examples, the machine learning model(s) 116 generates the vector 128 using less than all of the feature maps(s) 122. For example, if the backbone 120 generating four feature maps 122, then the machine learning model(s) 116 may generate the vector 128 using one of the feature maps 122, two of the feature maps 122, or three of the feature maps 122. Additionally, in some examples, the machine learning model(s) 116 may generate the vector 128 using specific feature map(s), such as the lowest resolution feature map(s) 122, the highest resolution feature map(s) 122, and/or any other combination of the feature map(s) 122.

The method 300, at block B306, includes applying the vector to a transformer of the machine learning model(s) 116. For instance, the machine learning model(s) 116 may input the vector 128 into the transformer 130 of the machine learning model(s) 116. As described herein, the transformer 130 may include at least the encoder 134, the decoder 144, and the FFN(s) 154 that are used to process the vector 128.

The method 300, at block B308, includes generating, by the transformer, data representing at least one of a class label for an object depicted by an image represented by the sensor data or a location of the object within the image. For instance, the transformer 130 of the machine learning model(s) 116 may generate the output data 132. In some examples, such as when the machine learning model(s) 116 is trained for object detection, the output data 132 may represent the class label for the object and/or the location of the object. Additionally, in some examples, where the sensor data 118 represents multiple objects, the output data 132 may represent the class labels and/or locations for each of the objects.

Figure 4:
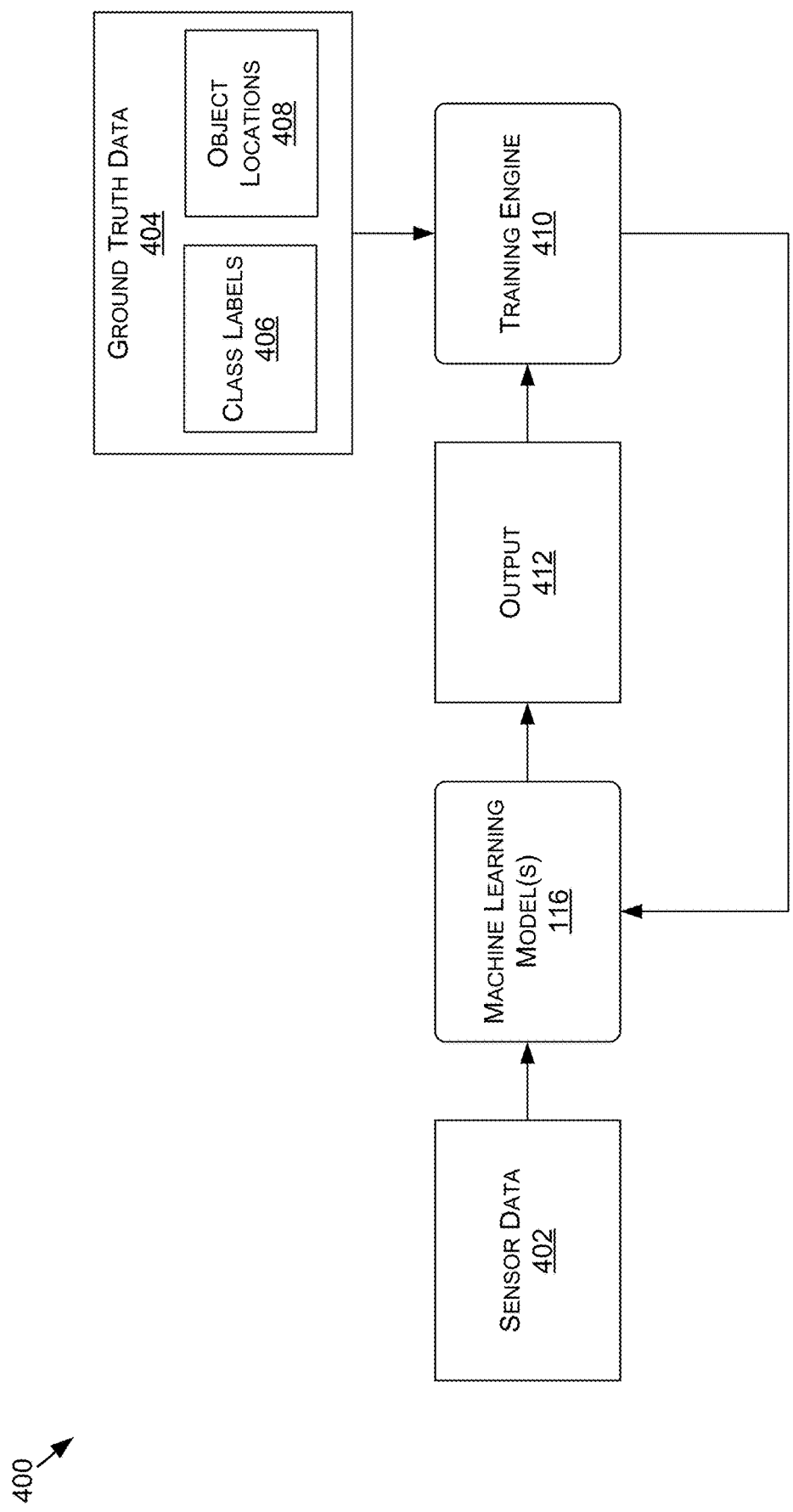
FIG. 4 is a data flow diagram illustrating a process for training a machine learning model(s) for object detection, in accordance with some embodiments of the present disclosure.

Now referring to FIG. 4, FIG. 4 is a data flow diagram illustrating a process 400 for training the machine learning model(s) 116 (and/or similarly the machine learning model(s) 102) for object detection, in accordance with some embodiments of the present disclosure. As shown, the machine learning model(s) 116 may be trained using sensor data 402. The sensor data 402 used for training may include original images (e.g., as captured by one or more image sensors), down-sampled images, up-sampled images, cropped or region of interest (ROI) images, otherwise augmented images, and/or a combination thereof. The sensor data 402 may be images captured by one or more sensors (e.g., cameras) in one or more static locations with a corresponding field of view(s), sensors of various dynamically moving objects such as vehicles, robots, or machines, and/or may be images captured from within a virtual environment used for testing and/or generating training images (e.g., a virtual camera of a virtual vehicle within a virtual or simulated environment). In some examples, the sensor data 402 may include images from a data store or repository of training images (e.g., images of driving surfaces).

As described herein, in order to increase the accuracy and/or precision of the machine learning model(s) 116, even when less than all of the feature maps 122 are used to generate the vector 128, the machine learning model(s) 116 may be trained using sensor data 402 that is selected specifically for the configuration of the machine learning model(s) 116. The sensor data 402 may represent images depicting various objects, such as people, objects on an assembly line or in a warehouse, items or structures in a retail environment or any other area with high activity or (foot) traffic (e.g., airport, train or bus station, plaza), vehicles, road features (e.g., road lines, traffic signs, curbs, etc.), structures, animals, and/or any other type of object. Additionally, the images may depict the objects using varying camera heights (e.g., cameras that are located on a same plane as the objects, cameras that are located a first distance above the objects, cameras that are located a second distance above the objects, etc.), varying camera angles (e.g., cameras that are pointed at fronts of the objects, cameras that are pointed at sides of the objects, cameras that are pointed at tops of the objects, etc.), varying poses (e.g., objects walking, objects standing, objects lying flat, etc.), and/or in varying environmental conditions (e.g., during the night, during the day, while raining, etc.).

Figure 5A:
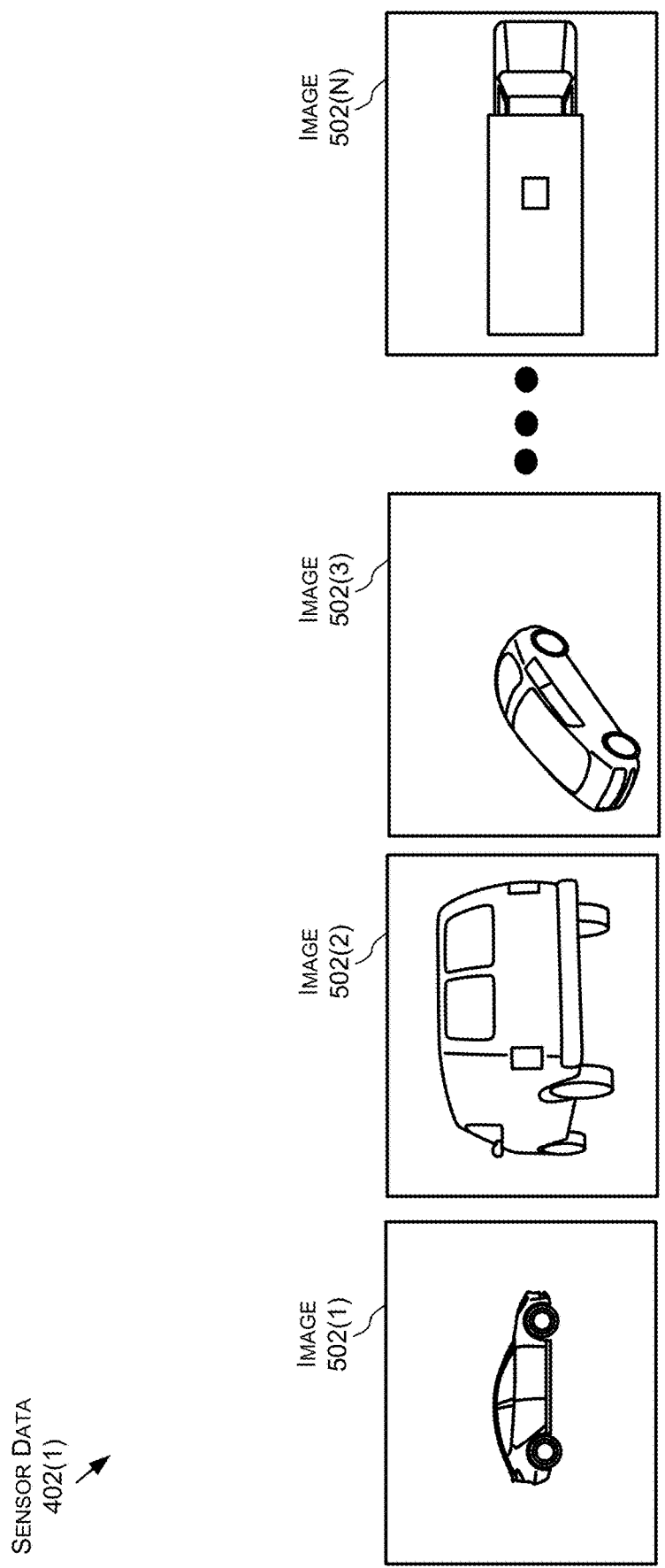
FIGS. 5A-5C illustrate examples of training data for a machine learning model(s) that is trained for object detection, in accordance with some embodiments of the present disclosure.

In some examples, the sensor data 402 may be selected based on a class of objects that the machine learning model(s) 116 is configured to detect. For instance, FIG. 5A illustrates an example of sensor data 402(1) being selected based on the class of objects that the machine learning model(s) 116 is configured to detect, in accordance with some embodiments of the present disclosure. As shown, the sensor data 402(1) represents images 502(1)-(N) (also referred to singularly as "image 502" or in plural as "images 502") depicting the same class of objects, which is vehicles in the example of FIG. 5A. However, in other examples, the class of objects depicted by the images 502 may include any other class, such as people, road features (e.g., road lines, traffic signs, curbs, etc.), structures, animals, and/or any other class. Additionally, in some examples, the sensor data 402(1) may represent any number of images 502, such as one image 502, ten images 502, one hundred images 502, one thousand images 502, and/or the like.

As further shown in the example of FIG. 5A, the images 502 depict the objects from varying angles and/or varying distances. In some examples, using the images 502 that depict the objects from varying angles and/or varying distances may increase the accuracy and precision of the machine learning model(s) 116 when detecting that class of objects. For example, the machine learning model(s) 116 may be able to detect objects that are close to a sensor(s), far from the sensor(s), and/or at different angles with respect to the sensor(s) that generates the sensor data being processed by the machine learning model(s) 116.

In some examples, the sensor data 402 may be selected based on the location(s) of the sensor(s) that generate the sensor data 402 being processed by the machine learning model(s) 116. For a first example, if the sensor(s) that is generating the sensor data 402 is going to be located a large distance off the ground plane, then the sensor data 402 for the machine learning model(s) 116 may represent images that are mostly and/or entirely captured by sensors located a large distance off the ground plane (e.g., at least a threshold distance off the ground plane). For a second example, if the machine learning model(s) 116 is going to be executing in vehicles, then the sensor data 402 for the machine learning model(s) 116 may include images that are mostly and/or entirely captured by sensors located closer to the ground plane (e.g., within a threshold distance from the ground plane).

Figure 5B:
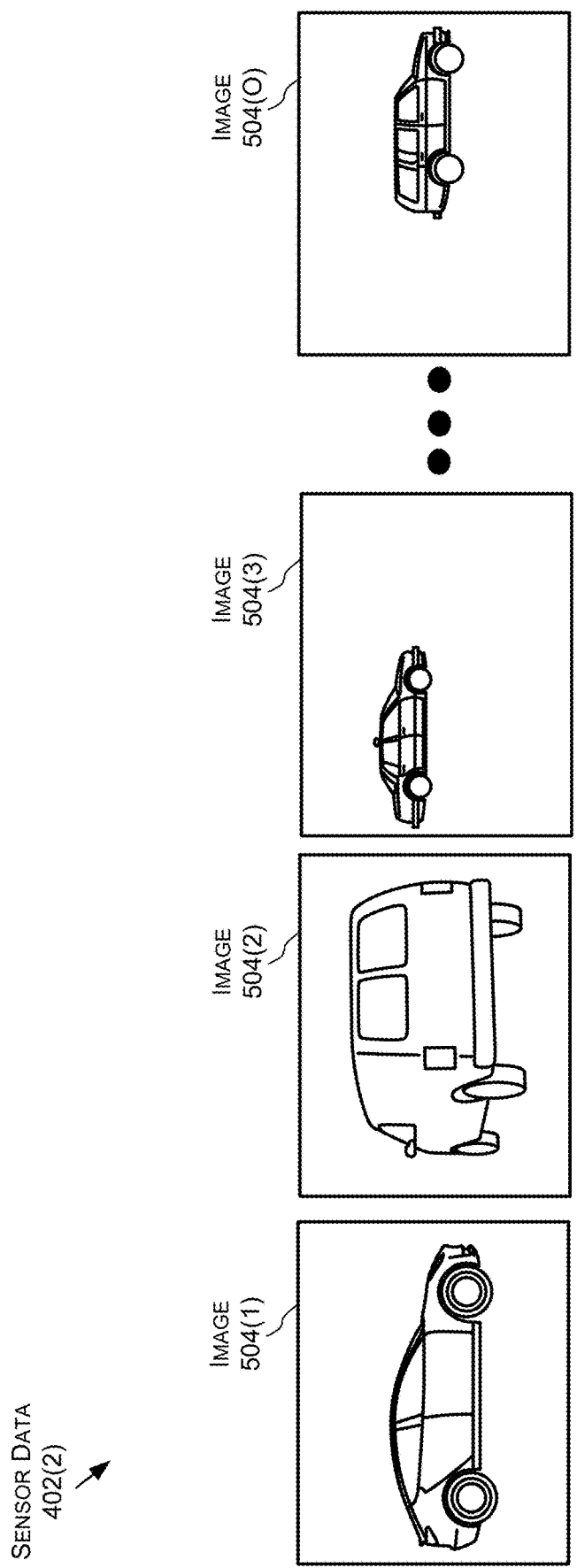

For instance, FIG. 5B illustrates an example of sensor data 402(2) being selected based on a location(s) of a sensor(s) that is generating the sensor data 118 being processed by the machine learning model(s) 116, in accordance with some embodiments of the present disclosure. As shown, the sensor data 402(2) represents images 504(1)-(0) (also referred to singularly as "image 504" or in plural as "images 504") generated by sensors that were close to a ground plane. While the example of FIG. 5B illustrates the images 504 as only depicting vehicles, in other examples, the images 504 may additionally, and/or alternatively, depict other types of objects. Additionally, in some examples, the sensor data 402(2) may represent any number of images 504, such as one image 504, ten images 504, one hundred images 504, one thousand images 504, and/or the like.

Still, in some examples, the sensor data 402 may be selected based on the feature maps 122 that the machine learning model(s) 116 is trained to use when performing object detection. For a first example, if the machine learning model(s) 116 is configured to use the two lowest resolution feature maps 122(3)-(4), then the sensor data 402 for the machine learning model(s) 116 may mostly and/or entirely depict objects at a larger scale (e.g., a large portion of the pixels of the images depict the objects). For a second example, if the machine learning model(s) 116 is configured to use the two highest resolution feature maps 122(1)-(2), then the sensor data 402 for the machine learning model(s) 116 may depict objects at any scale. This is because the machine learning model(s) 116 may have a high accuracy of detecting objects that are depicted in images using a large scale (e.g., close to the sensor(s)) when the machine learning model(s) 116 uses the two lowest resolution feature maps 122(3)-(4). Additionally, the machine learning model(s) 116 may have high accuracy of detecting any object when the machine learning model(s) 116 uses the two highest resolution feature maps 122(1)-(2).

Figure 5C:
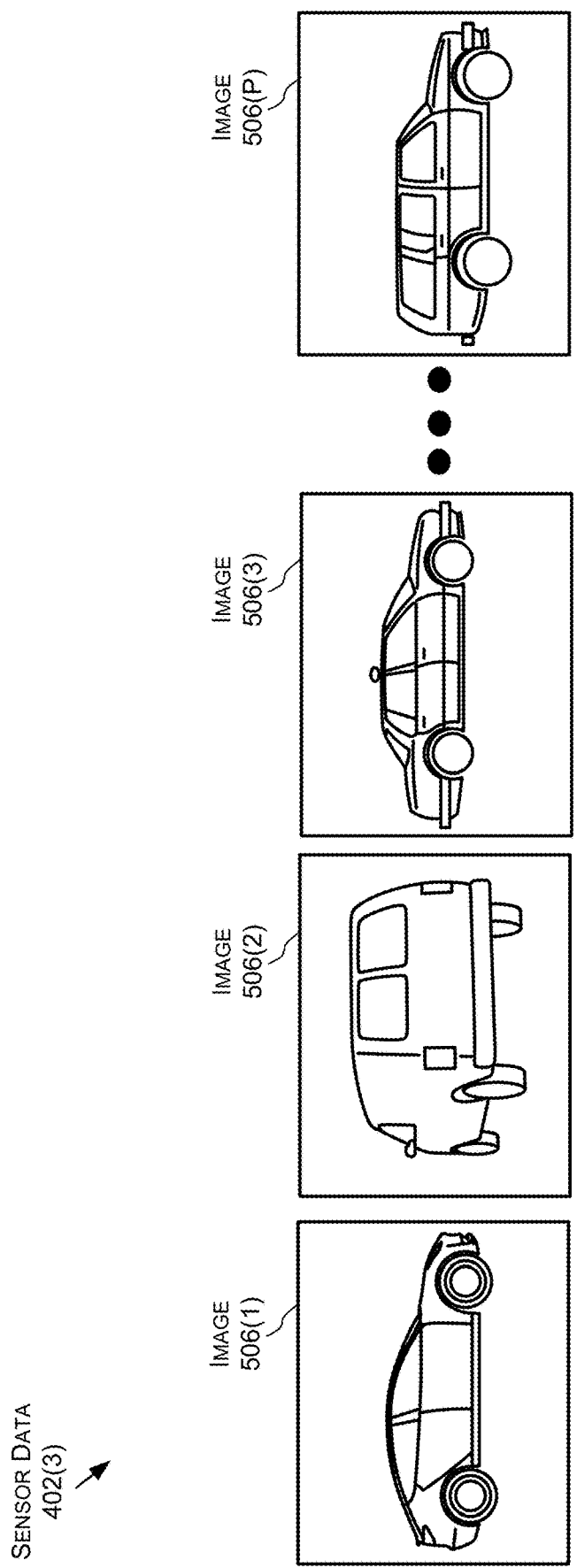

For instance, FIG. 5C illustrates an example of sensor data 402(3) being selected based on the feature map(s) 122 that the machine learning model(s) 116 is trained to use for object detection, in accordance with some embodiments of the present disclosure. In the example of FIG. 5C, the machine learning model(s) 116 may be configured to use the two lowest resolution feature maps 122(3)-(4) when processing the sensor data 118. As such, images 506(1)-(P) (also referred to singularly as "image 506" or in plural as "images 506") represented by the sensor data 402(3) may mostly and/or entirely depict objects at a large scale. For instance, and as shown, a large portion of the images 506 depict the objects as compared to the objects depicted by the images 502 and/or the objects depicted by the images 504. While the example of FIG. 5C illustrates the images 506 as only depicting vehicles, in other examples, the images 506 may additionally, and/or alternatively, depict other types of objects. Additionally, in some examples, the sensor data 402(3) may represent any number of images 506, such as one image 506, ten images 506, one hundred images 506, one thousand images 506, and/or the like.

While the example of FIG. 5C illustrates images 506 for training the machine learning model(s) 116 when the machine learning model(s) 116 is trained to use the two lowest resolution feature maps 112(3)-(4), in other examples, similar processes may be performed to train the machine learning model(s) 116 when the machine learning model(s) 116 is trained to use other combinations of feature maps 122. For example, if the machine learning model(s) 116 is trained to use the two highest resolution feature maps 122(1)-(2), then the sensor data 402 used to train the machine learning model(s) 116 may include the sensor data 402(1) and/or the sensor data 402(2). This is because the machine learning model(s) 116 may include a better accuracy and/or precision for detecting objects from any distance when using the highest resolution feature maps 122(1)-(2) as compared to using the lowest resolution feature maps 122 (3)-(4).

Referring back to FIG. 4, the machine learning model(s) 116 may be trained using the images as well as corresponding ground truth data 404. The ground truth data 404 may include annotations, labels, masks, and/or the like. For example, in some embodiments, the ground truth data 404 may include class labels 406 and/or object locations 408. The ground truth data 404 may be generated within a drawing program (e.g., an annotation program), a computer aided design (CAD) program, a labeling program, another type of program suitable for generating the ground truth data 404, and/or may be hand drawn, in some examples. In any example, the ground truth data 404 may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines the location of the labels), and/or a combination thereof (e.g., human identifies vertices of polylines, machine generates polygons using polygon rasterizer). In some examples, for each input image, there may be corresponding ground truth data 404.

A training engine 410 may include one or more loss functions that measure loss (e.g., error) in outputs 412 as compared to the ground truth data 404. Any type of loss function may be used, such as cross entropy loss, mean squared error, mean absolute error, mean bias error, and/or other loss function types. In some embodiments, different outputs 412 may have different loss functions. For example, the class labels may have a first loss function and the locations may have a second loss function. In such examples, the loss functions may be combined to form a total loss, and the total loss may be used to train (e.g., update the parameters of) the machine learning model(s) 116. In any example, backward pass computations may be performed to recursively compute gradients of the loss function(s) with respect to training parameters. In some examples, weight and biases of the machine learning model(s) 116 may be used to compute these gradients.

Figure 6:
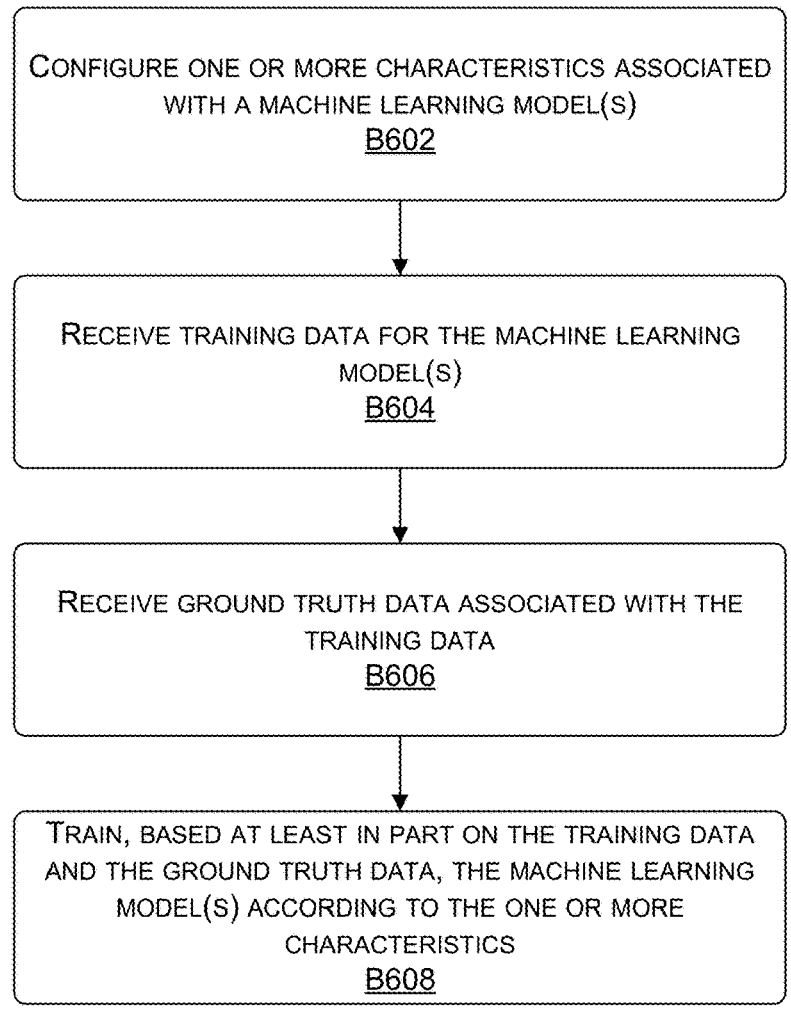
FIG. 6 illustrates a flow diagram showing a method for training a machine learning model(s) for object detection, in accordance with some embodiments of the present disclosure.

Now referring to FIG. 6, each block of method 600, described herein, comprises a computing process that may be performed using any combination of hardware, firmware, and/or software. For instance, various functions may be carried out by a processor executing instructions stored in memory. The method 600 may also be embodied as computer-usable instructions stored on computer storage media. The method 600 may be provided by a standalone application, a service or hosted service (standalone or in combination with another hosted service), or a plug-in to another product, to name a few. In addition, the method 600 is described, by way of example, with respect to the machine learning model(s) 116 of FIGS. 1B and 4. However, the method 600 may additionally or alternatively be executed by any one system, or any combination of systems, including, but not limited to, those described herein.

FIG. 6 illustrates a flow diagram showing the method 600 for training the machine learning model(s) 116 for object detection, in accordance with some embodiments of the present disclosure. The method 600, at block B602, includes configuring one or more characteristics associated with a machine learning model(s). For instance, the machine learning model(s) 116 may be configured according to the one or more characteristics. In some examples, the one or more characteristics may include a number of feature maps 122 generated by the backbone 120 of the machine learning model(s) 116, a number of feature maps 122 selected for generating the vector 128, and/or a combination of the feature map(s) 122 that are selected for generating the vector 128. Additionally, or alternatively, in some examples, the one or more characteristics may include a number of layers 138 of the encoder 134 and/or a number of layers 148 of the decoder 144.

As described herein, the one or more characteristics may be selected based on the execution of the machine learning model(s) 116. For a first example, if the machine learning model(s) 116 is configured to detect objects that are close, such as proximate to the sensor(s) generating sensor data being processed by the machine learning model(s) 116, then the one or more characteristics may include using the lowest resolution feature map(s) 122. This is because the machine learning model(s) 116 may still be able to achieve a high accuracy and precision using the lowest resolution feature map(s) 122, while simultaneously reducing the compute resources required and/or latency introduced by the machine learning model(s) 116 as compared to traditional object detection models (such as deformable-DETR). For a second example, if the machine learning model(s) 116 is configured to detect objects that are far, such as located a distance from the sensor(s) generating the sensor data being processed by the machine learning model(s) 116, then the one or more characteristics may include using the highest resolution feature maps 122. This is because the machine learning model(s) 116 may be able to achieve a high accuracy by using just the highest resolution feature map(s) 122, while simultaneously reducing the compute resources required and/or latency introduced by the machine learning model(s) 116 as compared to the traditional object detection models.

The method 600, at block B604, includes receiving training data for the machine learning model(s). For instance, the sensor data 402 may be received for the machine learning model(s) 116. As described herein, in some examples, the sensor data 402 is selected based on the one or more characteristics, the object class(es) that the machine learning model(s) is configured to detect, and/or the location(s) of the sensor(s) that generates the sensor data being processed by the machine learning model(s) 116. For a first example, if the machine learning model(s) 116 is trained to use the lowest resolution feature map(s) 122, then the sensor data 402 for the machine learning model(s) 116 may mostly and/or entirely depict objects at a larger scale (e.g., a large portion of the pixels of the images depict the objects). For a second example, if the machine learning model(s) 116 is configured to use the highest resolution feature map(s) 122, then the sensor data 402 for the machine learning model(s) 116 may depict objects at any scale.

The method 600, at block B606, includes receiving ground truth data associated with the training data. For instance, the ground truth data 404 for the sensor data 402 may be received. As described herein, the ground truth data 404 may include annotations, labels, masks, and/or the like. For example, in some embodiments, the ground truth data 404 may include the class labels 406 and/or the object locations 408 associated with the sensor data 402.

The method 600, at block B608, includes training, based at least in part on the training data and the ground truth data, the machine learning model(s) according to the one or more characteristics. For instance, the machine learning model(s) 102 may be trained (e.g., one or more parameters thereof may be updated) using the sensor data 402 and the ground truth data 404. In some examples, to train the machine learning model(s) 102, the training engine 410 may include one or more loss functions that measure loss (e.g., error) in the outputs 412 as compared to the ground truth data 404. Backwards pass computations may then be performed to recursively compute gradients of the loss function(s) with respect to training parameters. In some examples, weight and biases of the machine learning model(s) 116 may be used to compute these gradients.

Example Autonomous Vehicle

Figure 7A:
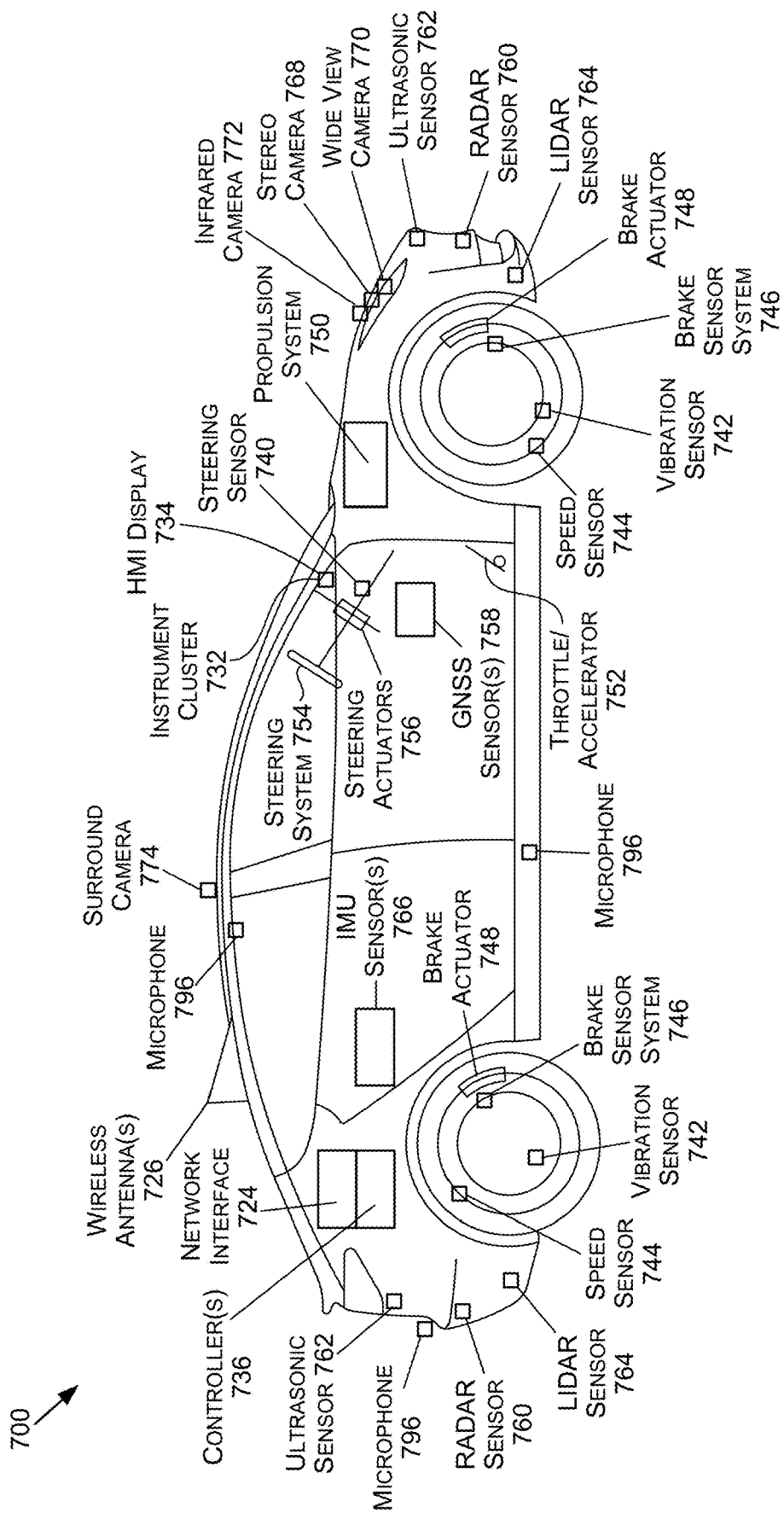
FIG. 7A is an illustration of an example autonomous vehicle, in accordance with some embodiments of the present disclosure.

FIG. 7A is an illustration of an example autonomous vehicle 700, in accordance with some embodiments of the present disclosure. The autonomous vehicle 700 (alternatively referred to herein as the "vehicle 700") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a robotic vehicle, a drone, an airplane, a vehicle coupled to a trailer (e.g., a semi-tractor-trailer truck used for hauling cargo), and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 700 may be capable of functionality in accordance with one or more of Level 3-Level 5 of the autonomous driving levels. The vehicle 700 may be capable of functionality in accordance with one or more of Level 1-Level 5 of the autonomous driving levels. For example, the vehicle 700 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 700 or other machine, such as being fully autonomous, being highly autonomous, being conditionally autonomous, being partially autonomous, providing assistive autonomy, being semi-autonomous, being primarily autonomous, or other designation.

The vehicle 700 may include components such as a chassis, a vehicle body, wheels (e.g., 2, 4, 6, 8, 18, etc.), tires, axles, and other components of a vehicle. The vehicle 700 may include a propulsion system 750, such as an internal combustion engine, hybrid electric power plant, an all-electric engine, and/or another propulsion system type. The propulsion system 750 may be connected to a drive train of the vehicle 700, which may include a transmission, to enable the propulsion of the vehicle 700. The propulsion system 750 may be controlled in response to receiving signals from the throttle/accelerator 752.

A steering system 754, which may include a steering wheel, may be used to steer the vehicle 700 (e.g., along a desired path or route) when the propulsion system 750 is operating (e.g., when the vehicle is in motion). The steering system 754 may receive signals from a steering actuator 756. The steering wheel may be optional for full automation (Level 5) functionality.

The brake sensor system 746 may be used to operate the vehicle brakes in response to receiving signals from the brake actuators 748 and/or brake sensors.

Controller(s) 736, which may include one or more system on chips (SoCs) 704 (FIG. 7C) and/or GPU(s), may provide signals (e.g., representative of commands) to one or more components and/or systems of the vehicle 700. For example, the controller(s) may send signals to operate the vehicle brakes via one or more brake actuators 748, to operate the steering system 754 via one or more steering actuators 756, to operate the propulsion system 750 via one or more throttle/accelerators 752. The controller(s) 736 may include one or more onboard (e.g., integrated) computing devices (e.g., supercomputers) that process sensor signals, and output operation commands (e.g., signals representing commands) to enable autonomous driving and/or to assist a human driver in driving the vehicle 700. The controller(s) 736 may include a first controller 736 for autonomous driving functions, a second controller 736 for functional safety functions, a third controller 736 for artificial intelligence functionality (e.g., computer vision), a fourth controller 736 for infotainment functionality, a fifth controller 736 for redundancy in emergency conditions, and/or other controllers. In some examples, a single controller 736 may handle two or more of the above functionalities, two or more controllers 736 may handle a single functionality, and/or any combination thereof.

The controller(s) 736 may provide the signals for controlling one or more components and/or systems of the vehicle 700 in response to sensor data received from one or more sensors (e.g., sensor inputs). The sensor data may be received from, for example and without limitation, global navigation satellite systems ("GNSS") sensor(s) 758 (e.g., Global Positioning System sensor(s)), RADAR sensor(s) 760, ultrasonic sensor(s) 762, LIDAR sensor(s) 764, inertial measurement unit (IMU) sensor(s) 766 (e.g., accelerometer(s), gyroscope(s), magnetic compass(es), magnetometer(s), etc.), microphone(s) 796, stereo camera(s) 768, wide-view camera(s) 770 (e.g., fisheye cameras), infrared camera(s) 772, surround camera(s) 774 (e.g., 360 degree cameras), long-range and/or mid-range camera(s) 798, speed sensor(s) 744 (e.g., for measuring the speed of the vehicle 700), vibration sensor(s) 742, steering sensor(s) 740, brake sensor(s) (e.g., as part of the brake sensor system 746), and/or other sensor types.

One or more of the controller(s) 736 may receive inputs (e.g., represented by input data) from an instrument cluster 732 of the vehicle 700 and provide outputs (e.g., represented by output data, display data, etc.) via a human-machine interface (HMI) display 734, an audible annunciator, a loudspeaker, and/or via other components of the vehicle 700. The outputs may include information such as vehicle velocity, speed, time, map data (e.g., the High Definition ("HD") map 722 of FIG. 7C), location data (e.g., the vehicle's 700 location, such as on a map), direction, location of other vehicles (e.g., an occupancy grid), information about objects and status of objects as perceived by the controller(s) 736, etc. For example, the HMI display 734 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 700 further includes a network interface 724 which may use one or more wireless antenna(s) 726 and/or modem(s) to communicate over one or more networks. For example, the network interface 724 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. The wireless antenna(s) 726 may also enable communication between objects in the environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Figure 7B:
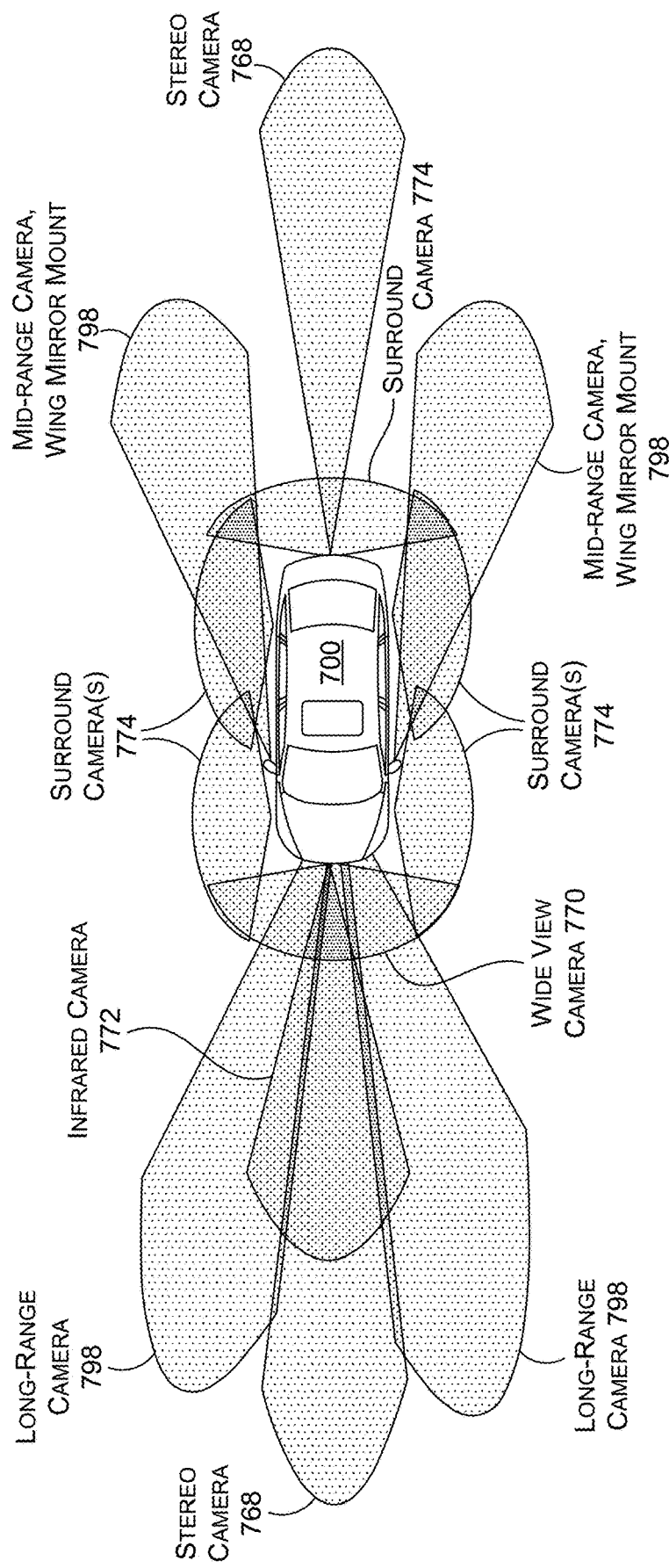
FIG. 7B is an example of camera locations and fields of view for the example autonomous vehicle of FIG. 7A, in accordance with some embodiments of the present disclosure.

FIG. 7B is an example of camera locations and fields of view for the example autonomous vehicle 700 of FIG. 7A, in accordance with some embodiments of the present disclosure. The cameras and respective fields of view are one example embodiment and are not intended to be limiting. For example, additional and/or alternative cameras may be included and/or the cameras may be located at different locations on the vehicle 700.

The camera types for the cameras may include, but are not limited to, digital cameras that may be adapted for use with the components and/or systems of the vehicle 700. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (three dimensional ("3D") printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 700 (e.g., front-facing cameras) may be used for surround view, to help identify forward facing paths and obstacles, as well aid in, with the help of one or more controllers 736 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings ("LDW"), Autonomous Cruise Control ("ACC"), and/or other functions such as traffic sign recognition.

A variety of cameras may be used in a front-facing configuration, including, for example, a monocular camera platform that includes a complementary metal oxide semiconductor ("CMOS") color imager. Another example may be a wide-view camera(s) 770 that may be used to perceive objects coming into view from the periphery (e.g., pedestrians, crossing traffic or bicycles). Although only one wide-view camera is illustrated in FIG. 7B, there may be any number (including zero) of wide-view cameras 770 on the vehicle 700. In addition, any number of long-range camera(s) 798 (e.g., a long-view stereo camera pair) may be used for depth-based object detection, especially for objects for which a neural network has not yet been trained. The long-range camera(s) 798 may also be used for object detection and classification, as well as basic object tracking.

Any number of stereo cameras 768 may also be included in a front-facing configuration. In at least one embodiment, one or more of stereo camera(s) 768 may include an integrated control unit comprising a scalable processing unit, which may provide a programmable logic ("FPGA") and a multi-core micro-processor with an integrated Controller Area Network ("CAN") or Ethernet interface on a single chip. Such a unit may be used to generate a 3D map of the vehicle's environment, including a distance estimate for all the points in the image. An alternative stereo camera(s) 768 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 768 may be used in addition to, or alternatively from, those described herein.

Cameras with a field of view that include portions of the environment to the side of the vehicle 700 (e.g., side-view cameras) may be used for surround view, providing information used to create and update the occupancy grid, as well as to generate side impact collision warnings. For example, surround camera(s) 774 (e.g., four surround cameras 774 as illustrated in FIG. 7B) may be positioned to on the vehicle 700. The surround camera(s) 774 may include wide-view camera(s) 770, fisheye camera(s), 360 degree camera(s), and/or the like. Four example, four fisheye cameras may be positioned on the vehicle's front, rear, and sides. In an alternative arrangement, the vehicle may use three surround camera(s) 774 (e.g., left, right, and rear), and may leverage one or more other camera(s) (e.g., a forward-facing camera) as a fourth surround view camera.

Cameras with a field of view that include portions of the environment to the rear of the vehicle 700 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 798, stereo camera(s) 768), infrared camera(s) 772, etc.), as described herein.

Figure 7C:
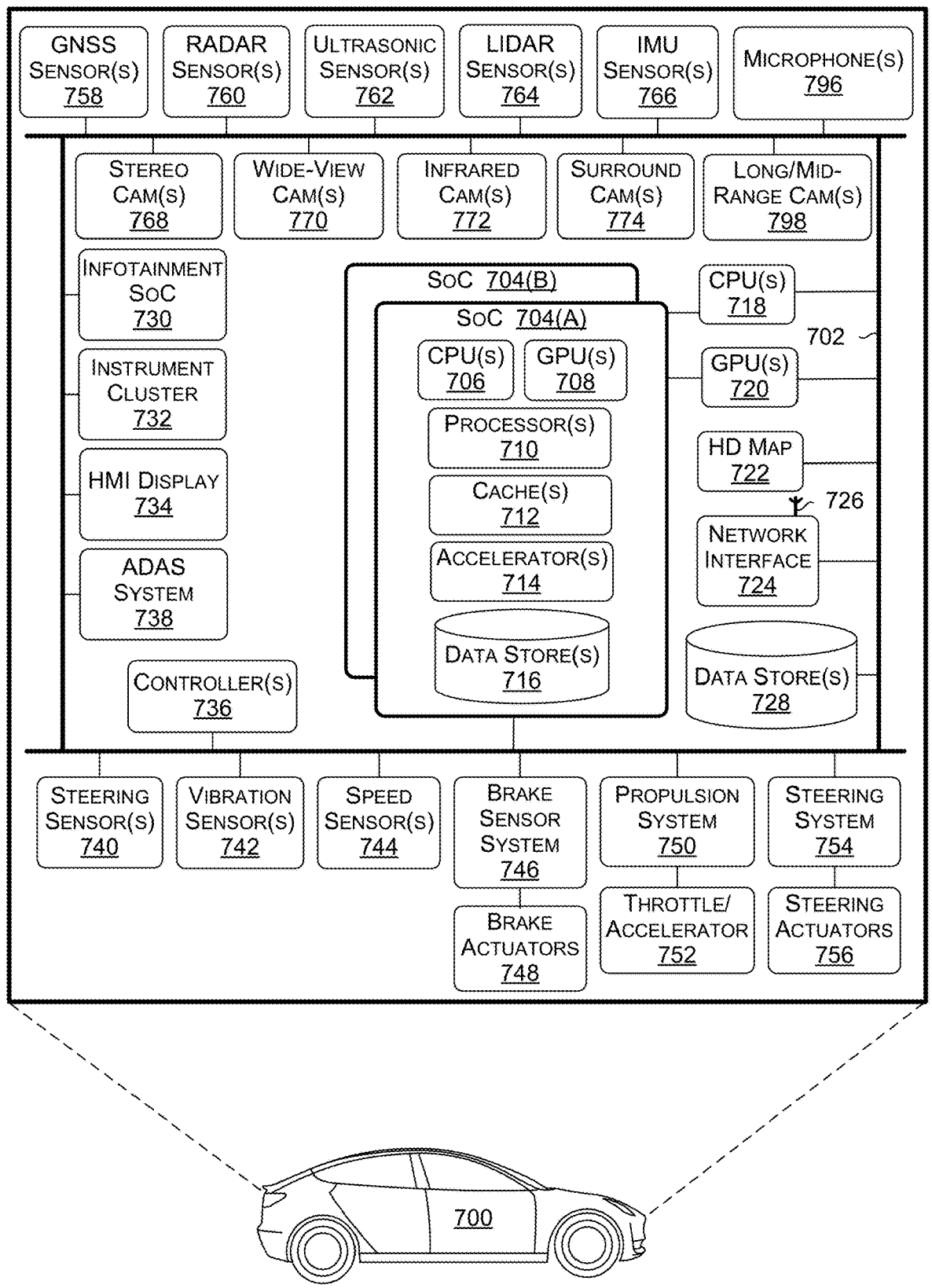
FIG. 7C is a block diagram of an example system architecture for the example autonomous vehicle of FIG. 7A, in accordance with some embodiments of the present disclosure.

FIG. 7C is a block diagram of an example system architecture for the example autonomous vehicle 700 of FIG. 7A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 700 in FIG. 7C are illustrated as being connected via bus 702. The bus 702 may include a Controller Area Network (CAN) data interface (alternatively referred to herein as a "CAN bus"). A CAN may be a network inside the vehicle 700 used to aid in control of various features and functionality of the vehicle 700, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 702 is described herein as being a CAN bus, this is not intended to be limiting. For example, in addition to, or alternatively from, the CAN bus, FlexRay and/or Ethernet may be used. Additionally, although a single line is used to represent the bus 702, this is not intended to be limiting. For example, there may be any number of busses 702, which may include one or more CAN busses, one or more FlexRay busses, one or more Ethernet busses, and/or one or more other types of busses using a different protocol. In some examples, two or more busses 702 may be used to perform different functions, and/or may be used for redundancy. For example, a first bus 702 may be used for collision avoidance functionality and a second bus 702 may be used for actuation control. In any example, each bus 702 may communicate with any of the components of the vehicle 700, and two or more busses 702 may communicate with the same components. In some examples, each SoC 704, each controller 736, and/or each computer within the vehicle may have access to the same input data (e.g., inputs from sensors of the vehicle 700), and may be connected to a common bus, such the CAN bus.

The vehicle 700 may include one or more controller(s) 736, such as those described herein with respect to FIG. 7A. The controller(s) 736 may be used for a variety of functions. The controller(s) 736 may be coupled to any of the various other components and systems of the vehicle 700, and may be used for control of the vehicle 700, artificial intelligence of the vehicle 700, infotainment for the vehicle 700, and/or the like.

The vehicle 700 may include a system(s) on a chip (SoC) 704. The SoC 704 may include CPU(s) 706, GPU(s) 708, processor(s) 710, cache(s) 712, accelerator(s) 714, data store(s) 716, and/or other components and features not illustrated. The SoC(s) 704 may be used to control the vehicle 700 in a variety of platforms and systems. For example, the SoC(s) 704 may be combined in a system (e.g., the system of the vehicle 700) with an HD map 722 which may obtain map refreshes and/or updates via a network interface 724 from one or more servers (e.g., server(s) 778 of FIG. 7D).

The CPU(s) 706 may include a CPU cluster or CPU complex (alternatively referred to herein as a "CCPLEX"). The CPU(s) 706 may include multiple cores and/or L2 caches. For example, in some embodiments, the CPU(s) 706 may include eight cores in a coherent multi-processor configuration. In some embodiments, the CPU(s) 706 may include four dual-core clusters where each cluster has a dedicated L2 cache (e.g., a 2 MB L2 cache). The CPU(s) 706 (e.g., the CCPLEX) may be configured to support simultaneous cluster operation enabling any combination of the clusters of the CPU(s) 706 to be active at any given time.

The CPU(s) 706 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 706 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 708 may include an integrated GPU (alternatively referred to herein as an "iGPU"). The GPU(s) 708 may be programmable and may be efficient for parallel workloads. The GPU(s) 708, in some examples, may use an enhanced tensor instruction set. The GPU(s) 708 may include one or more streaming microprocessors, where each streaming microprocessor may include an L1 cache (e.g., an L1 cache with at least 96 KB storage capacity), and two or more of the streaming microprocessors may share an L2 cache (e.g., an L2 cache with a 512 KB storage capacity). In some embodiments, the GPU(s) 708 may include at least eight streaming microprocessors. The GPU(s) 708 may use compute application programming interface(s) (API(s)). In addition, the GPU(s) 708 may use one or more parallel computing platforms and/or programming models (e.g., NVIDIA's CUDA).

The GPU(s) 708 may be power-optimized for best performance in automotive and embedded use cases. For example, the GPU(s) 708 may be fabricated on a Fin field-effect transistor (FinFET). However, this is not intended to be limiting and the GPU(s) 708 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 708 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graphics random-access memory (SGRAM) may be used, such as a graphics double data rate type five synchronous random-access memory (GDDR5).

The GPU(s) 708 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 708 to access the CPU(s) 706 page tables directly. In such examples, when the GPU(s) 708 memory management unit (MMU) experiences a miss, an address translation request may be transmitted to the CPU(s) 706. In response, the CPU(s) 706 may look in its page tables for the virtual-to-physical mapping for the address and transmits the translation back to the GPU(s) 708. As such, unified memory technology may allow a single unified virtual address space for memory of both the CPU(s) 706 and the GPU(s) 708, thereby simplifying the GPU(s) 708 programming and porting of applications to the GPU(s) 708.

In addition, the GPU(s) 708 may include an access counter that may keep track of the frequency of access of the GPU(s) 708 to memory of other processors. The access counter may help ensure that memory pages are moved to the physical memory of the processor that is accessing the pages most frequently.

The SoC(s) 704 may include any number of cache(s) 712, including those described herein. For example, the cache(s) 712 may include an L3 cache that is available to both the CPU(s) 706 and the GPU(s) 708 (e.g., that is connected both the CPU(s) 706 and the GPU(s) 708). The cache(s) 712 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 704 may include an arithmetic logic unit(s) (ALU(s)) which may be leveraged in performing processing with respect to any of the variety of tasks or operations of the vehicle 700—such as processing DNNs. In addition, the SoC(s) 704 may include a floating point unit(s) (FPU(s))— or other math coprocessor or numeric coprocessor types— for performing mathematical operations within the system. For example, the SoC(s) 704 may include one or more FPUs integrated as execution units within a CPU(s) 706 and/or GPU(s) 708.

The SoC(s) 704 may include one or more accelerators 714 (e.g., hardware accelerators, software accelerators, or a combination thereof). For example, the SoC(s) 704 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 708 and to off-load some of the tasks of the GPU(s) 708 (e.g., to free up more cycles of the GPU(s) 708 for performing other tasks). As an example, the accelerator(s) 714 may be used for targeted workloads (e.g., perception, convolutional neural networks (CNNs), the machine learning model(s) 102, the machine learning model(s) 116, etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 714 (e.g., the hardware acceleration cluster) may include a deep learning accelerator(s) (DLA). The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks (e.g., the machine learning model(s) 102, the machine learning model(s) 116, etc.), especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 708, and by using an inference accelerator, for example, a designer may target either the DLA(s) or the GPU(s) 708 for any function. For example, the designer may focus processing of CNNs and floating point operations on the DLA(s) and leave other functions to the GPU(s) 708 and/or other accelerator(s) 714.

The accelerator(s) 714 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 706. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMD), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 714 (e.g., the hardware acceleration cluster) may include a computer vision network on-chip and SRAM, for providing a high-bandwidth, low latency SRAM for the accelerator(s) 714. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 704 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 714 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network (e.g., the machine learning model(s) 102, the machine learning model(s) 116, etc.) that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 766 output that correlates with the vehicle 700 orientation, distance, 3D location estimates of the object obtained from the neural network and/or other sensors (e.g., LIDAR sensor(s) 764 or RADAR sensor(s) 760), among others.

The SoC(s) 704 may include data store(s) 716 (e.g., memory). The data store(s) 716 may be on-chip memory of the SoC(s) 704, which may store neural networks to be executed on the GPU and/or the DLA. In some examples, the data store(s) 716 may be large enough in capacity to store multiple instances of neural networks for redundancy and safety. The data store(s) 712 may comprise L2 or L3 cache(s) 712. Reference to the data store(s) 716 may include reference to the memory associated with the PVA, DLA, and/or other accelerator(s) 714, as described herein.

The SoC(s) 704 may include one or more processor(s) 710 (e.g., embedded processors). The processor(s) 710 may include a boot and power management processor that may be a dedicated processor and subsystem to handle boot power and management functions and related security enforcement. The boot and power management processor may be a part of the SoC(s) 704 boot sequence and may provide runtime power management services. The boot power and management processor may provide clock and voltage programming, assistance in system low power state transitions, management of SoC(s) 704 thermals and temperature sensors, and/or management of the SoC(s) 704 power states. Each temperature sensor may be implemented as a ring-oscillator whose output frequency is proportional to temperature, and the SoC(s) 704 may use the ring-oscillators to detect temperatures of the CPU(s) 706, GPU(s) 708, and/or accelerator(s) 714. If temperatures are determined to exceed a threshold, the boot and power management processor may enter a temperature fault routine and put the SoC(s) 704 into a lower power state and/or put the vehicle 700 into a chauffeur to safe stop mode (e.g., bring the vehicle 700 to a safe stop).

The processor(s) 710 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 710 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 710 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 710 may further include a real-time camera engine that may include a dedicated processor subsystem for handling real-time camera management.

The processor(s) 710 may further include a high-dynamic range signal processor that may include an image signal processor that is a hardware engine that is part of the camera processing pipeline.

The processor(s) 710 may include a video image compositor that may be a processing block (e.g., implemented on a microprocessor) that implements video post-processing functions needed by a video playback application to produce the final image for the player window. The video image compositor may perform lens distortion correction on wide-view camera(s) 770, surround camera(s) 774, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's infotainment system and settings, or provide voice-activated web surfing. Certain functions are available to the driver only when the vehicle is operating in an autonomous mode, and are disabled otherwise.

The video image compositor may include enhanced temporal noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 708 is not required to continuously render new surfaces. Even when the GPU(s) 708 is powered on and active doing 3D rendering, the video image compositor may be used to offload the GPU(s) 708 to improve performance and responsiveness.

The SoC(s) 704 may further include a mobile industry processor interface (MIPI) camera serial interface for receiving video and input from cameras, a high-speed interface, and/or a video input block that may be used for camera and related pixel input functions. The SoC(s) 704 may further include an input/output controller(s) that may be controlled by software and may be used for receiving I/O signals that are uncommitted to a specific role.

The SoC(s) 704 may further include a broad range of peripheral interfaces to enable communication with peripherals, audio codecs, power management, and/or other devices. The SoC(s) 704 may be used to process data from cameras (e.g., connected over Gigabit Multimedia Serial Link and Ethernet), sensors (e.g., LIDAR sensor(s) 764, RADAR sensor(s) 760, etc. that may be connected over Ethernet), data from bus 702 (e.g., speed of vehicle 700, steering wheel position, etc.), data from GNSS sensor(s) 758 (e.g., connected over Ethernet or CAN bus). The SoC(s) 704 may further include dedicated high-performance mass storage controllers that may include their own DMA engines, and that may be used to free the CPU(s) 706 from routine data management tasks.

The SoC(s) 704 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. The SoC(s) 704 may be faster, more reliable, and even more energy-efficient and space-efficient than conventional systems. For example, the accelerator(s) 714, when combined with the CPU(s) 706, the GPU(s) 708, and the data store(s) 716, may provide for a fast, efficient platform for level 3-5 autonomous vehicles.

The technology thus provides capabilities and functionality that cannot be achieved by conventional systems. For example, computer vision algorithms may be executed on CPUs, which may be configured using high-level programming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration cluster, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 720) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Complex) that when flashing lights are detected, icy conditions exist. The flashing light may be identified by operating a third deployed neural network over multiple frames, informing the vehicle's path-planning software of the presence (or absence) of flashing lights. All three neural networks may run simultaneously, such as within the DLA and/or on the GPU(s) 708.

In some examples, a CNN for facial recognition and vehicle owner identification may use data from camera sensors to identify the presence of an authorized driver and/or owner of the vehicle 700. The always on sensor processing engine may be used to unlock the vehicle when the owner approaches the driver door and turn on the lights, and, in security mode, to disable the vehicle when the owner leaves the vehicle. In this way, the SoC(s) 704 provide for security against theft and/or carjacking.

In another example, a CNN for emergency vehicle detection and identification may use data from microphones 796 to detect and identify emergency vehicle sirens. In contrast to conventional systems, that use general classifiers to detect sirens and manually extract features, the SoC(s) 704 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 758. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pulling over to the side of the road, parking the vehicle, and/or idling the vehicle, with the assistance of ultrasonic sensors 762, until the emergency vehicle(s) passes.

The vehicle may include a CPU(s) 718 (e.g., discrete CPU(s), or dCPU(s)), that may be coupled to the SoC(s) 704 via a high-speed interconnect (e.g., PCIe). The CPU(s) 718 may include an X86 processor, for example. The CPU(s) 718 may be used to perform any of a variety of functions, including arbitrating potentially inconsistent results between ADAS sensors and the SoC(s) 704, and/or monitoring the status and health of the controller(s) 736 and/or infotainment SoC 730, for example.

The vehicle 700 may include a GPU(s) 720 (e.g., discrete GPU(s), or dGPU(s)), that may be coupled to the SoC(s) 704 via a high-speed interconnect (e.g., NVIDIA's NVLINK).

The GPU(s) 720 may provide additional artificial intelligence functionality, such as by executing redundant and/or different neural networks, and may be used to train and/or update neural networks based on input (e.g., sensor data) from sensors of the vehicle 700.

The vehicle 700 may further include the network interface 724 which may include one or more wireless antennas 726 (e.g., one or more wireless antennas for different communication protocols, such as a cellular antenna, a Bluetooth antenna, etc.). The network interface 724 may be used to enable wireless connectivity over the Internet with the cloud (e.g., with the server(s) 778 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 700 information about vehicles in proximity to the vehicle 700 (e.g., vehicles in front of, on the side of, and/or behind the vehicle 700). This functionality may be part of a cooperative adaptive cruise control functionality of the vehicle 700.

The network interface 724 may include a SoC that provides modulation and demodulation functionality and enables the controller(s) 736 to communicate over wireless networks. The network interface 724 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 700 may further include data store(s) 728 which may include off-chip (e.g., off the SoC(s) 704) storage. The data store(s) 728 may include one or more storage elements including RAM, SRAM, DRAM, VRAM, Flash, hard disks, and/or other components and/or devices that may store at least one bit of data.

The vehicle 700 may further include GNSS sensor(s) 758. The GNSS sensor(s) 758 (e.g., GPS, assisted GPS sensors, differential GPS (DGPS) sensors, etc.), to assist in mapping, perception, occupancy grid generation, and/or path planning functions. Any number of GNSS sensor(s) 758 may be used, including, for example and without limitation, a GPS using a USB connector with an Ethernet to Serial (RS-232) bridge.

The vehicle 700 may further include RADAR sensor(s) 760. The RADAR sensor(s) 760 may be used by the vehicle 700 for long-range vehicle detection, even in darkness and/or severe weather conditions. RADAR functional safety levels may be ASIL B. The RADAR sensor(s) 760 may use the CAN and/or the bus 702 (e.g., to transmit data generated by the RADAR sensor(s) 760) for control and to access object tracking data, with access to Ethernet to access raw data in some examples. A wide variety of RADAR sensor types may be used. For example, and without limitation, the RADAR sensor(s) 760 may be suitable for front, rear, and side RADAR use. In some example, Pulse Doppler RADAR sensor(s) are used.

The RADAR sensor(s) 760 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 760 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 700 surroundings at higher speeds with minimal interference from traffic in adjacent lanes. The other two antennae may expand the field of view, making it possible to quickly detect vehicles entering or leaving the vehicle's 700 lane.

Mid-range RADAR systems may include, as an example, a range of up to 760 m (front) or 80 m (rear), and a field of view of up to 42 degrees (front) or 750 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 700 may further include ultrasonic sensor(s) 762. The ultrasonic sensor(s) 762, which may be positioned at the front, back, and/or the sides of the vehicle 700, may be used for park assist and/or to create and update an occupancy grid. A wide variety of ultrasonic sensor(s) 762 may be used, and different ultrasonic sensor(s) 762 may be used for different ranges of detection (e.g., 2.5 m, 4 m). The ultrasonic sensor(s) 762 may operate at functional safety levels of ASIL B.

The vehicle 700 may include LIDAR sensor(s) 764. The LIDAR sensor(s) 764 may be used for object and pedestrian detection, emergency braking, collision avoidance, and/or other functions. The LIDAR sensor(s) 764 may be functional safety level ASIL B. In some examples, the vehicle 700 may include multiple LIDAR sensors 764 (e.g., two, four, six, etc.) that may use Ethernet (e.g., to provide data to a Gigabit Ethernet switch).

In some examples, the LIDAR sensor(s) 764 may be capable of providing a list of objects and their distances for a 360-degree field of view. Commercially available LIDAR sensor(s) 764 may have an advertised range of approximately 700 m, with an accuracy of 2 cm-3 cm, and with support for a 700 Mbps Ethernet connection, for example. In some examples, one or more non-protruding LIDAR sensors 764 may be used. In such examples, the LIDAR sensor(s) 764 may be implemented as a small device that may be embedded into the front, rear, sides, and/or corners of the vehicle 700. The LIDAR sensor(s) 764, in such examples, may provide up to a 120-degree horizontal and 35-degree vertical field-of-view, with a 200 m range even for low-reflectivity objects. Front-mounted LIDAR sensor(s) 764 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 700. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 764 may be less susceptible to motion blur, vibration, and/or shock.

The vehicle may further include IMU sensor(s) 766. The IMU sensor(s) 766 may be located at a center of the rear axle of the vehicle 700, in some examples. The IMU sensor(s) 766 may include, for example and without limitation, an accelerometer(s), a magnetometer(s), a gyroscope(s), a magnetic compass(es), and/or other sensor types. In some examples, such as in six-axis applications, the IMU sensor(s) 766 may include accelerometers and gyroscopes, while in nine-axis applications, the IMU sensor(s) 766 may include accelerometers, gyroscopes, and magnetometers.

In some embodiments, the IMU sensor(s) 766 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 766 may enable the vehicle 700 to estimate heading without requiring input from a magnetic sensor by directly observing and correlating the changes in velocity from GPS to the IMU sensor(s) 766. In some examples, the IMU sensor(s) 766 and the GNSS sensor(s) 758 may be combined in a single integrated unit.

The vehicle may include microphone(s) 796 placed in and/or around the vehicle 700. The microphone(s) 796 may be used for emergency vehicle detection and identification, among other things.

The vehicle may further include any number of camera types, including stereo camera(s) 768, wide-view camera(s) 770, infrared camera(s) 772, surround camera(s) 774, long-range and/or mid-range camera(s) 798, and/or other camera types. The cameras may be used to capture image data around an entire periphery of the vehicle 700. The types of cameras used depends on the embodiments and requirements for the vehicle 700, and any combination of camera types may be used to provide the necessary coverage around the vehicle 700. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 7A and FIG. 7B.

The vehicle 700 may further include vibration sensor(s) 742. The vibration sensor(s) 742 may measure vibrations of components of the vehicle, such as the axle(s). For example, changes in vibrations may indicate a change in road surfaces. In another example, when two or more vibration sensors 742 are used, the differences between the vibrations may be used to determine friction or slippage of the road surface (e.g., when the difference in vibration is between a power-driven axle and a freely rotating axle).

The vehicle 700 may include an ADAS system 738. The ADAS system 738 may include a SoC, in some examples. The ADAS system 738 may include autonomous/adaptive/ automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 760, LIDAR sensor(s) 764, and/or a camera(s). The ACC systems may include longitudinal ACC and/or lateral ACC. Longitudinal ACC monitors and controls the distance to the vehicle immediately ahead of the vehicle 700 and automatically adjust the vehicle speed to maintain a safe distance from vehicles ahead. Lateral ACC performs distance keeping, and advises the vehicle 700 to change lanes when necessary. Lateral ACC is related to other ADAS applications such as LCA and CWS.

CACC uses information from other vehicles that may be received via the network interface 724 and/or the wireless antenna(s) 726 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 700), while the I2V communication concept provides information about traffic further ahead. CACC systems may include either or both I2V and V2V information sources. Given the information of the vehicles ahead of the vehicle 700, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 760, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 760, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 700 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 700 if the vehicle 700 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 760, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 700 is backing up. Some RCTW systems include AEB to ensure that the vehicle brakes are applied to avoid a crash. RCTW systems may use one or more rear-facing RADAR sensor(s) 760, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 700, the vehicle 700 itself must, in the case of conflicting results, decide whether to heed the result from a primary computer or a secondary computer (e.g., a first controller 736 or a second controller 736). For example, in some embodiments, the ADAS system 738 may be a backup and/or secondary computer for providing perception information to a backup computer rationality module. The backup computer rationality monitor may run a redundant diverse software on hardware components to detect faults in perception and dynamic driving tasks. Outputs from the ADAS system 738 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 704.

In other examples, ADAS system 738 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 738 may be fed into the primary computer's perception block and/or the primary computer's dynamic driving task block. For example, if the ADAS system 738 indicates a forward crash warning due to an object immediately ahead, the perception block may use this information when identifying objects. In other examples, the secondary computer may have its own neural network which is trained and thus reduces the risk of false positives, as described herein.

The vehicle 700 may further include the infotainment SoC 730 (e.g., an in-vehicle infotainment system (IVI)). Although illustrated and described as a SoC, the infotainment system may not be a SoC, and may include two or more discrete components. The infotainment SoC 730 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 700. For example, the infotainment SoC 730 may radios, disk players, navigation systems, video players, USB and Bluetooth connectivity, carputers, in-car entertainment, Wi-Fi, steering wheel audio controls, hands free voice control, a heads-up display (HUD), an HMI display 734, a telematics device, a control panel (e.g., for controlling and/or interacting with various components, features, and/or systems), and/or other components. The infotainment SoC 730 may further be used to provide information (e.g., visual and/or audible) to a user(s) of the vehicle, such as information from the ADAS system 738, autonomous driving information such as planned vehicle maneuvers, trajectories, surrounding environment information (e.g., intersection information, vehicle information, road information, etc.), and/or other information.

The infotainment SoC 730 may include GPU functionality. The infotainment SoC 730 may communicate over the bus 702 (e.g., CAN bus, Ethernet, etc.) with other devices, systems, and/or components of the vehicle 700. In some examples, the infotainment SoC 730 may be coupled to a supervisory MCU such that the GPU of the infotainment system may perform some self-driving functions in the event that the primary controller(s) 736 (e.g., the primary and/or backup computers of the vehicle 700) fail. In such an example, the infotainment SoC 730 may put the vehicle 700 into a chauffeur to safe stop mode, as described herein.

The vehicle 700 may further include an instrument cluster 732 (e.g., a digital dash, an electronic instrument cluster, a digital instrument panel, etc.). The instrument cluster 732 may include a controller and/or supercomputer (e.g., a discrete controller or supercomputer). The instrument cluster 732 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 730 and the instrument cluster 732. In other words, the instrument cluster 732 may be included as part of the infotainment SoC 730, or vice versa.

Figure 7D:
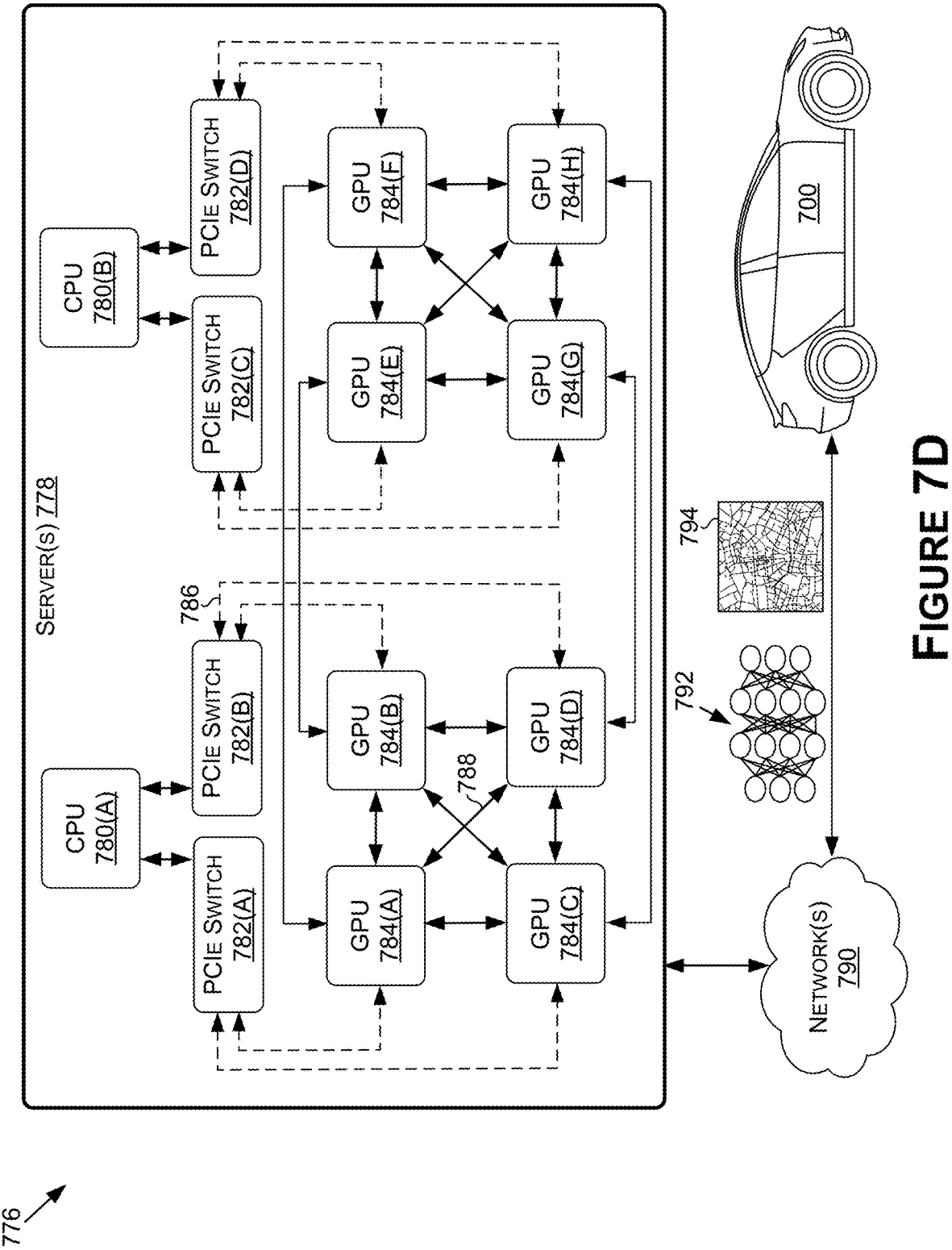
FIG. 7D is a system diagram for communication between cloud-based server(s) and the example autonomous vehicle of FIG. 7A, in accordance with some embodiments of the present disclosure.

FIG. 7D is a system diagram for communication between cloud-based server(s) and the example autonomous vehicle 700 of FIG. 7A, in accordance with some embodiments of the present disclosure. The system 776 may include server(s) 778, network(s) 790, and vehicles, including the vehicle 700. The server(s) 778 may include a plurality of GPUs 784(A)-784(H) (collectively referred to herein as GPUs 784), PCIe switches 782(A)-782(H) (collectively referred to herein as PCIe switches 782), and/or CPUs 780(A)-780(B) (collectively referred to herein as CPUs 780). The GPUs 784, the CPUs 780, and the PCIe switches may be interconnected with high-speed interconnects such as, for example and without limitation, NVLink interfaces 788 developed by NVIDIA and/or PCIe connections 786. In some examples, the GPUs 784 are connected via NVLink and/or NVSwitch SoC and the GPUs 784 and the PCIe switches 782 are connected via PCIe interconnects. Although eight GPUs 784, two CPUs 780, and two PCIe switches are illustrated, this is not intended to be limiting. Depending on the embodiment, each of the server(s) 778 may include any number of GPUs 784, CPUs 780, and/or PCIe switches. For example, the server(s) 778 may each include eight, sixteen, thirty-two, and/or more GPUs 784.

The server(s) 778 may receive, over the network(s) 790 and from the vehicles, image data representative of images showing unexpected or changed road conditions, such as recently commenced road-work. The server(s) 778 may transmit, over the network(s) 790 and to the vehicles, neural networks 792, updated neural networks 792, and/or map information 794, including information regarding traffic and road conditions. The updates to the map information 794 may include updates for the HD map 722, such as information regarding construction sites, potholes, detours, flooding, and/or other obstructions. In some examples, the neural networks 792, the updated neural networks 792, and/or the map information 794 may have resulted from new training and/or experiences represented in data received from any number of vehicles in the environment, and/or based on training performed at a datacenter (e.g., using the server(s) 778 and/or other servers).

The server(s) 778 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 790, and/or the machine learning models may be used by the server(s) 778 to remotely monitor the vehicles.

In some examples, the server(s) 778 may receive data from the vehicles and apply the data to up-to-date real-time neural networks for real-time intelligent inferencing. The server(s) 778 may include deep-learning supercomputers and/or dedicated AI computers powered by GPU(s) 784, such as a DGX and DGX Station machines developed by NVIDIA. However, in some examples, the server(s) 778 may include deep learning infrastructure that use only CPU-powered datacenters.

The deep-learning infrastructure of the server(s) 778 may be capable of fast, real-time inferencing, and may use that capability to evaluate and verify the health of the processors, software, and/or associated hardware in the vehicle 700. For example, the deep-learning infrastructure may receive periodic updates from the vehicle 700, such as a sequence of images and/or objects that the vehicle 700 has located in that sequence of images (e.g., via computer vision and/or other machine learning object classification techniques). The deep-learning infrastructure may run its own neural network to identify the objects and compare them with the objects identified by the vehicle 700 and, if the results do not match and the infrastructure concludes that the AI in the vehicle 700 is malfunctioning, the server(s) 778 may transmit a signal to the vehicle 700 instructing a fail-safe computer of the vehicle 700 to assume control, notify the passengers, and complete a safe parking maneuver.

For inferencing, the server(s) 778 may include the GPU(s) 784 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 8:
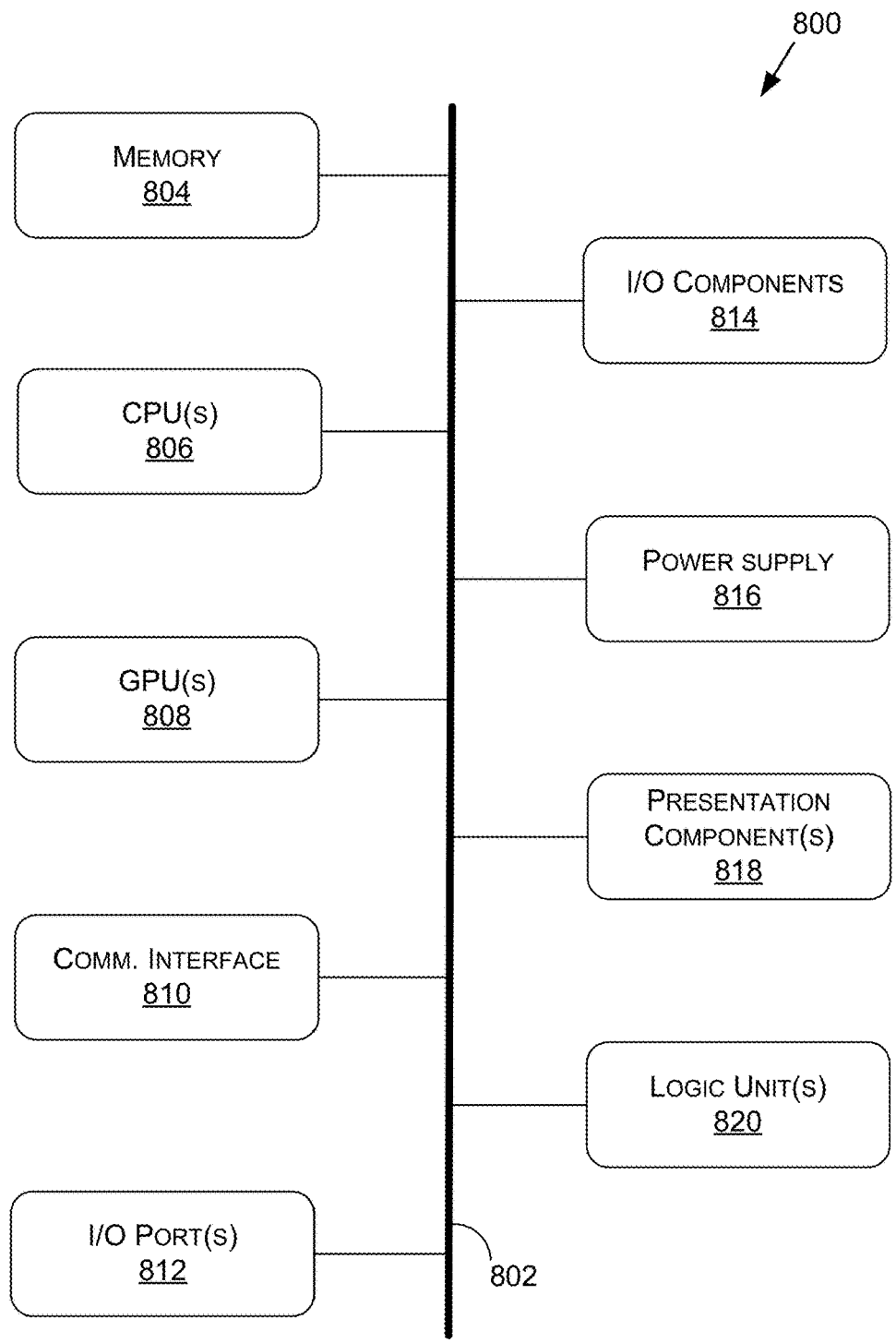
FIG. 8 is a block diagram of an example computing device suitable for use in implementing some embodiments of the present disclosure.

FIG. 8 is a block diagram of an example computing device(s) 800 suitable for use in implementing some embodiments of the present disclosure. Computing device 800 may include an interconnect system 802 that directly or indirectly couples the following devices: memory 804, one or more central processing units (CPUs) 806, one or more graphics processing units (GPUs) 808, a communication interface 810, input/output (I/O) ports 812, input/output components 814, a power supply 816, one or more presentation components 818 (e.g., display(s)), and one or more logic units 820. In at least one embodiment, the computing device(s) 800 may comprise one or more virtual machines (VMs), and/or any of the components thereof may comprise virtual components (e.g., virtual hardware components). For non-limiting examples, one or more of the GPUs 808 may comprise one or more vGPUs, one or more of the CPUs 806 may comprise one or more vCPUs, and/or one or more of the logic units 820 may comprise one or more virtual logic units. As such, a computing device(s) 800 may include discrete components (e.g., a full GPU dedicated to the computing device 800), virtual components (e.g., a portion of a GPU dedicated to the computing device 800), or a combination thereof.

Although the various blocks of FIG. 8 are shown as connected via the interconnect system 802 with lines, this is not intended to be limiting and is for clarity only. For example, in some embodiments, a presentation component 818, such as a display device, may be considered an I/O component 814 (e.g., if the display is a touch screen). As another example, the CPUs 806 and/or GPUs 808 may include memory (e.g., the memory 804 may be representative of a storage device in addition to the memory of the GPUs 808, the CPUs 806, and/or other components). In other words, the computing device of FIG. 8 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 8.

The interconnect system 802 may represent one or more links or busses, such as an address bus, a data bus, a control bus, or a combination thereof. The interconnect system 802 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 806 may be directly connected to the memory 804. Further, the CPU 806 may be directly connected to the GPU 808. Where there is direct, or point-to-point connection between components, the interconnect system 802 may include a PCIe link to carry out the connection. In these examples, a PCI bus need not be included in the computing device 800.

The memory 804 may include any of a variety of computer-readable media. The computer-readable media may be any available media that may be accessed by the computing device 800. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 804 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 800. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 806 may be configured to execute at least some of the computer-readable instructions to control one or more components of the computing device 800 to perform one or more of the methods and/or processes described herein. The CPU(s) 806 may each include one or more cores (e.g., one, two, four, eight, twenty-eight, seventy-two, etc.) that are capable of handling a multitude of software threads simultaneously. The CPU(s) 806 may include any type of processor, and may include different types of processors depending on the type of computing device 800 implemented (e.g., processors with fewer cores for mobile devices and processors with more cores for servers). For example, depending on the type of computing device 800, the processor may be an Advanced RISC Machines (ARM) processor implemented using Reduced Instruction Set Computing (RISC) or an x86 processor implemented using Complex Instruction Set Computing (CISC). The computing device 800 may include one or more CPUs 806 in addition to one or more microprocessors or supplementary co-processors, such as math co-processors.

In addition to or alternatively from the CPU(s) 806, the GPU(s) 808 may be configured to execute at least some of the computer-readable instructions to control one or more components of the computing device 800 to perform one or more of the methods and/or processes described herein. One or more of the GPU(s) 808 may be an integrated GPU (e.g., with one or more of the CPU(s) 806 and/or one or more of the GPU(s) 808 may be a discrete GPU. In embodiments, one or more of the GPU(s) 808 may be a coprocessor of one or more of the CPU(s) 806. The GPU(s) 808 may be used by the computing device 800 to render graphics (e.g., 3D graphics) or perform general purpose computations. For example, the GPU(s) 808 may be used for General-Purpose computing on GPUs (GPGPU). The GPU(s) 808 may include hundreds or thousands of cores that are capable of handling hundreds or thousands of software threads simultaneously. The GPU(s) 808 may generate pixel data for output images in response to rendering commands (e.g., rendering commands from the CPU(s) 806 received via a host interface). The GPU(s) 808 may include graphics memory, such as display memory, for storing pixel data or any other suitable data, such as GPGPU data. The display memory may be included as part of the memory 804. The GPU(s) 808 may include two or more GPUs operating in parallel (e.g., via a link). The link may directly connect the GPUs (e.g., using NVLINK) or may connect the GPUs through a switch (e.g., using NVSwitch). When combined together, each GPU 808 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 806 and/or the GPU(s) 808, the logic unit(s) 820 may be configured to execute at least some of the computer-readable instructions to control one or more components of the computing device 800 to perform one or more of the methods and/or processes described herein. In embodiments, the CPU(s) 806, the GPU(s) 808, and/or the logic unit(s) 820 may discretely or jointly perform any combination of the methods, processes and/or portions thereof. One or more of the logic units 820 may be part of and/or integrated in one or more of the CPU(s) 806 and/or the GPU(s) 808 and/or one or more of the logic units 820 may be discrete components or otherwise external to the CPU(s) 806 and/or the GPU(s) 808. In embodiments, one or more of the logic units 820 may be a coprocessor of one or more of the CPU(s) 806 and/or one or more of the GPU(s) 808.

Examples of the logic unit(s) 820 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 810 may include one or more receivers, transmitters, and/or transceivers that enable the computing device 800 to communicate with other computing devices via an electronic communication network, included wired and/or wireless communications. The communication interface 810 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 820 and/or communication interface 810 may include one or more data processing units (DPUs) to transmit data received over a network and/or through interconnect system 802 directly to (e.g., a memory of) one or more GPU(s) 808.

The I/O ports 812 may enable the computing device 800 to be logically coupled to other devices including the I/O components 814, the presentation component(s) 818, and/or other components, some of which may be built in to (e.g., integrated in) the computing device 800. Illustrative I/O components 814 include a microphone, mouse, keyboard, joystick, game pad, game controller, satellite dish, scanner, printer, wireless device, etc. The I/O components 814 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 800. The computing device 800 may be include depth cameras, such as stereoscopic camera systems, infrared camera systems, RGB camera systems, touchscreen technology, and combinations of these, for gesture detection and recognition. Additionally, the computing device 800 may include accelerometers or gyroscopes (e.g., as part of an inertia measurement unit (IMU)) that enable detection of motion. In some examples, the output of the accelerometers or gyroscopes may be used by the computing device 800 to render immersive augmented reality or virtual reality.

The power supply 816 may include a hard-wired power supply, a battery power supply, or a combination thereof. The power supply 816 may provide power to the computing device 800 to enable the components of the computing device 800 to operate.

The presentation component(s) 818 may include a display (e.g., a monitor, a touch screen, a television screen, a heads-up-display (HUD), other display types, or a combination thereof), speakers, and/or other presentation components. The presentation component(s) 818 may receive data from other components (e.g., the GPU(s) 808, the CPU(s) 806, DPUs, etc.), and output the data (e.g., as an image, video, sound, etc.).

Example Data Center

Figure 9:
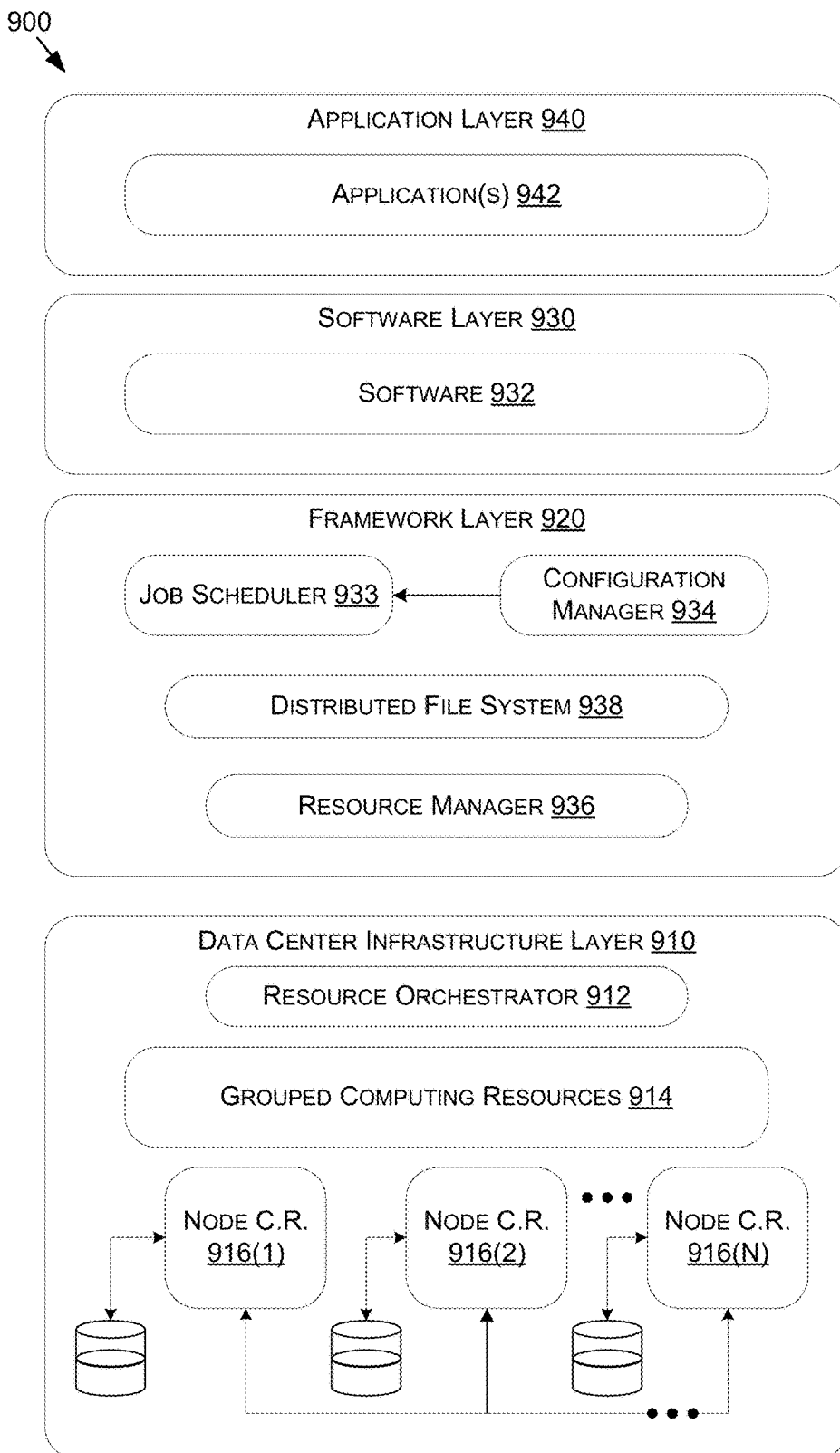
FIG. 9 is a block diagram of an example data center suitable for use in implementing some embodiments of the present disclosure.

FIG. 9 illustrates an example data center 900 that may be used in at least one embodiments of the present disclosure. The data center 900 may include a data center infrastructure layer 910, a framework layer 920, a software layer 930, and/or an application layer 940.

As shown in FIG. 9, the data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 916(1)-916(N) may correspond to a server having one or more of the above-mentioned computing resources. In addition, in some embodiments, the node C.R.s 916(1)-9161(N) may include one or more virtual components, such as vGPUs, vCPUs, and/or the like, and/or one or more of the node C.R.s 916(1)-916(N) may correspond to a virtual machine (VM).

In at least one embodiment, grouped computing resources 914 may include separate groupings of node C.R.s 916 housed within one or more racks (not shown), or many racks housed in data centers at various geographical locations (also not shown). Separate groupings of node C.R.s 916 within grouped computing resources 914 may include grouped compute, network, memory or storage resources that may be configured or allocated to support one or more workloads. In at least one embodiment, several node C.R.s 916 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 912 may configure or otherwise control one or more node C.R.s 916(1)-916(N) and/or grouped computing resources 914. In at least one embodiment, resource orchestrator 912 may include a software design infrastructure (SDI) management entity for the data center 900. The resource orchestrator 912 may include hardware, software, or some combination thereof.

In at least one embodiment, as shown in FIG. 9, framework layer 920 may include a job scheduler 933, a configuration manager 934, a resource manager 936, and/or a distributed file system 938. The framework layer 920 may include a framework to support software 932 of software layer 930 and/or one or more application(s) 942 of application layer 940. The software 932 or application(s) 942 may respectively include web-based service software or applications, such as those provided by Amazon Web Services, Google Cloud and Microsoft Azure. The framework layer 920 may be, but is not limited to, a type of free and open-source software web application framework such as Apache Spark™ (hereinafter "Spark") that may utilize distributed file system 938 for large-scale data processing (e.g., "big data"). In at least one embodiment, job scheduler 933 may include a Spark driver to facilitate scheduling of workloads supported by various layers of data center 900. The configuration manager 934 may be capable of configuring different layers such as software layer 930 and framework layer 920 including Spark and distributed file system 938 for supporting large-scale data processing. The resource manager 936 may be capable of managing clustered or grouped computing resources mapped to or allocated for support of distributed file system 938 and job scheduler 933. In at least one embodiment, clustered or grouped computing resources may include grouped computing resource 914 at data center infrastructure layer 910. The resource manager 936 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 938 of framework layer 920. One or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 938 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 934, resource manager 936, and resource orchestrator 912 may implement any number and type of self-modifying actions based on any amount and type of data acquired in any technically feasible fashion. Self-modifying actions may relieve a data center operator of data center 900 from making possibly bad configuration decisions and possibly avoiding underutilized and/or poor performing portions of a data center.

The data center 900 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 900. In at least one embodiment, trained or deployed machine learning models corresponding to one or more neural networks may be used to infer or predict information using resources described above with respect to the data center 900 by using weight parameters calculated through one or more training techniques, such as but not limited to those described herein.

In at least one embodiment, the data center 900 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 800 of FIG. 8—e.g., each device may include similar components, features, and/or functionality of the computing device(s) 800. In addition, where backend devices (e.g., servers, NAS, etc.) are implemented, the backend devices may be included as part of a data center 900, an example of which is described in more detail herein with respect to FIG. 9.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 800 described herein with respect to FIG. 8. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
    generating, using one or more first layers of a machine learning model and based at least on image data representing an image, a set of feature maps, each feature map of the set of feature maps corresponding to a different respective resolution of a set of resolutions;
    determining a subset of the set of feature maps based at least on the subset of the set of feature maps being associated with one or more lowest resolutions of the set of resolutions;
    generating, using one or more second layers of the machine learning model, a first vector to represent the subset of the set of feature maps;
    generating, using an encoder of a transformer of the machine learning model and based at least on the first vector, a second vector; and
    generating, using a decoder of the transformer of the machine learning model and based at least on the second vector, an output indicating at least one of a class label for an object depicted in the image or a location of the object within the image.

2. The method of claim 1, wherein the one or more first layers of the machine learning model comprise two or more first layers, the two or more first layers comprising:
    at least a first layer of the two or more first layers to generate, based at least on the image data, a first feature map of the set of feature maps; and
    at least a second layer of the two or more first layers to generate, based at least on the image data, a second feature map of the set of feature maps.

3. The method of claim 1, wherein the one or more first layers correspond to a ResNet feature extractor, and each feature map of the set of feature maps is generated using a separate instance of the ResNet feature extractor.

4. The method of claim 1, wherein:
    the output is a third vector; and
    the method further comprises generating, using a feed-forward network of the transformer of the machine learning model and based at least on the third vector, data representing at least one of the class label for the object depicted in the image or the location of the object within the image.

5. The method of claim 1, wherein:
    the machine learning model uses the subset of the set of feature maps at the one or more lowest resolutions of the set of resolutions for object detection; and
    sensor data for training the machine learning model is selected based at least on the machine learning model using the subset of the set of feature maps.

6. One or more processors comprising processing circuitry to:
    generate, using a ResNet feature extractor of a neural network, at least a first feature map at a first resolution using a first instance of the ResNet feature extractor and a second feature map at a second resolution using a second instance of the ResNet feature extractor;
    generate, using the neural network and based at least on the first resolution and the second resolution, a vector representing the first feature map without representing the second feature map; and
    compute, using a transformer of the neural network and based at least on the vector, one or more outputs indicative of at least one of classification information or location information corresponding to one or more objects.

7. The one or more processors of claim 6, wherein:
    the neural network uses the first feature map at the first resolution without using the second feature map at the second resolution for object detection; and
    training sensor data for training the neural network is selected based at least on the neural network using the first feature map without using the second feature map.

8. The one or more processors of claim 7, wherein:
    the neural network further generates at least a third feature map at a third resolution; and
    the first feature map and the third feature map are used to generate the vector based at least on one or more object types that the training sensor data corresponds to.

9. The one or more processors of claim 6, wherein the vector is further generated based at least on one or more object types that the neural network is configured to detect.

10. The one or more processors of claim 6, wherein:
    the neural network further generates a third feature map at a third resolution and a fourth feature map at a fourth resolution; and
    the vector is further generated to represent the third feature map without representing the fourth feature map.

11. The one or more processors of claim 6, wherein the neural network is trained using training data generated using a plurality of sensors that have at least one of varying poses, fields of view, or orientations.

12. A system comprising:
    one or more processors to:
        generate, using one or more first layers of a machine learning model and based at least on image data representing an image, a set of feature maps, each feature map of the set of feature maps corresponding to a different resolution of a set of resolutions;
        generate, using one or more second layers of the machine learning model and based at least on a subset of the set of feature maps being associated with one or more lowest resolutions of the set of resolution, a vector that represents the subset of the set of feature maps; and
        generate, using a transformer of the machine learning model and based at least on the vector, an output indicating at least one of a class label for an object depicted in the image or a location of the object within the image.

13. The system of claim 12, wherein the one or more processors are to generate the set of feature maps using two or more first layers of the machine learning model, the two or more first layers comprising:
   at least a first layer that generates, based at least on the image data, a first feature map of the set of feature maps at a first resolution of the set of resolutions; and
   at least a second layer that generates, based at least on the image data, a second feature map of the set of features maps at a second resolution of the set of resolutions, the second resolution being different than the first resolution.

14. The system of claim 12, wherein the system is comprised in at least one of:
   a control system for an autonomous or semi-autonomous machine;
   a perception system for an autonomous or semi-autonomous machine;
   a system for performing simulation operations;
   a system for executing real-time streaming applications;
   a system for generating at least one of virtual reality content, augmented reality content, or mixed reality content;
   a system for performing digital twin operations;
   a system for performing light transport simulation;
   a system for performing collaborative content creation for 3D assets;
   a system for performing deep learning operations;
   a system implemented using an edge device;
   a system implemented using a robot;
   a system for performing conversational AI operations;
   a system for generating synthetic data;
   a system incorporating one or more virtual machines (VMs);
   a system implemented at least partially in a data center; or
   a system implemented at least partially using cloud computing resources.

15. The method of claim 1, wherein the determining the subset of the set of feature maps is further based at least on one or more object types being detected using the machine learning model.

16. The method of claim 1, wherein:
   the set of feature maps includes four feature maps; and
   the subset of the set of the feature maps includes one of two feature maps from the four feature maps or three feature maps from the four feature maps.

17. The one or more processors of claim 6, wherein the processing circuitry is further determine, based at least on one or more object types that the neural network is detecting, the first feature map for generating the vector.

18. The system of claim 12, wherein the vector is further generated based at least on one or more object types being detected using the machine learning model.

19. The system of claim 12, wherein:
   the set of feature maps includes four feature maps; and
   the subset of the set of the feature maps includes one of two feature maps from the four feature maps or three feature maps from the four feature maps.

20. The system of claim 12, wherein the one or more processors are further to at least one of:
   select the subset of the set of feature maps to include one feature map associated with a lowest resolution of the set of resolutions; or
   select the subset of the set of feature maps to include two feature maps associated with two lowest resolutions of the set of resolutions.

* * * * *